United States Patent
Nakada et al.

(10) Patent No.: US 9,062,148 B2
(45) Date of Patent: Jun. 23, 2015

(54) METHOD FOR PRODUCING FINE-PARTICLE-DISPERSED POLYOL, AND METHOD FOR PRODUCING POLYURETHANE RESIN

(75) Inventors: Shigekuni Nakada, Kyoto (JP); Takayuki Tsuji, Kyoto (JP); Yukiya Kobayashi, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 1095 days.

(21) Appl. No.: 12/670,585

(22) PCT Filed: Oct. 1, 2008

(86) PCT No.: PCT/JP2008/067807
§ 371 (c)(1),
(2), (4) Date: Jan. 25, 2010

(87) PCT Pub. No.: WO2009/048007
PCT Pub. Date: Apr. 16, 2009

(65) Prior Publication Data
US 2010/0222507 A1    Sep. 2, 2010

(30) Foreign Application Priority Data
Oct. 10, 2007  (JP) ................. 2007-264991

(51) Int. Cl.
C08K 5/06 (2006.01)
C08G 18/63 (2006.01)
C08F 2/10 (2006.01)
C08F 2/22 (2006.01)
C08F 2/44 (2006.01)
C08F 283/06 (2006.01)
C08G 18/40 (2006.01)
C08G 101/00 (2006.01)

(52) U.S. Cl.
CPC . *C08G 18/63* (2013.01); *C08F 2/10* (2013.01); *C08F 2/22* (2013.01); *C08F 2/44* (2013.01); *C08F 283/06* (2013.01); *C08G 18/4072* (2013.01); *C08G 18/632* (2013.01); *C08G 2101/0008* (2013.01); *C08G 2101/005* (2013.01); *C08G 2101/0083* (2013.01)

(58) Field of Classification Search
CPC ............. C08F 2/04; C08F 2/12; C08F 2/22; C08F 2/44
USPC ......... 524/755, 850, 855, 849; 521/155, 137; 528/425
See application file for complete search history.

(56) References Cited

U.S. PATENT DOCUMENTS

| | | | |
|---|---|---|---|
| 3,383,351 A | 5/1968 | Stamberger | |
| 4,148,840 A * | 4/1979 | Shah | 521/137 |
| 4,192,928 A | 3/1980 | Tanaka et al. | |
| 4,196,476 A * | 4/1980 | Steiner | 726/19 |
| 4,226,756 A | 10/1980 | Critchfield et al. | |
| 4,230,823 A | 10/1980 | Alberts et al. | |
| 4,723,026 A | 2/1988 | Cloetens et al. | |
| 4,745,153 A * | 5/1988 | Hoffman | 524/762 |
| 5,021,506 A | 6/1991 | Gastinger et al. | |
| 5,084,506 A * | 1/1992 | Faler et al. | 524/597 |
| 5,171,759 A | 12/1992 | Hager | |
| 5,196,476 A | 3/1993 | Simroth | |
| 5,358,984 A * | 10/1994 | Hayes et al. | 524/112 |
| 5,488,085 A | 1/1996 | Hayes et al. | |
| 5,494,957 A | 2/1996 | Moore et al. | |
| 5,814,699 A | 9/1998 | Kratz et al. | |
| 6,239,224 B1 * | 5/2001 | Mørk et al. | 525/242 |
| 6,624,209 B2 | 9/2003 | Kawamoto et al. | |
| 6,756,414 B2 * | 6/2004 | Kawamoto et al. | 521/137 |
| 8,772,405 B2 | 7/2014 | Tsuji et al. | |
| 2003/0004217 A1 | 1/2003 | Kawamoto et al. | |
| 2003/0181598 A1 | 9/2003 | Heyman et al. | |
| 2003/0216486 A1 | 11/2003 | Kawamoto et al. | |
| 2005/0245724 A1 | 11/2005 | Horiguchi et al. | |
| 2006/0025492 A1 | 2/2006 | Chauk | |
| 2006/0142441 A1 | 6/2006 | Chan et al. | |
| 2009/0018227 A1 | 1/2009 | Nakada et al. | |
| 2010/0036082 A1 | 2/2010 | Nakada et al. | |
| 2010/0210768 A1 | 8/2010 | Nakada et al. | |
| 2011/0086996 A1 * | 4/2011 | Nakada et al. | 528/73 |

(Continued)

FOREIGN PATENT DOCUMENTS

| | | |
|---|---|---|
| CN | 312302 | 9/2001 |
| EP | 0 786 480 | 7/1997 |

(Continued)

*Primary Examiner* — Jane L Stanley

(74) *Attorney, Agent, or Firm* — Hamre, Schumann, Mueller & Larson, P.C.

(57) ABSTRACT

A method for producing a fine-particle-dispersed polyol (I) is provided, the method including the steps (1) and (n−1): the step (1) of polymerizing an ethylenically unsaturated monomer (b) in a polyol (a), in the presence of fine particles (P1) and a radical polymerization initiator (c), so as to obtain a fine-particle-dispersed polyol intermediate (B2); and the step (n−1) of polymerizing (b) in a fine-particle-dispersed polyol intermediate (B(n−1)), in the presence of (c), so as to obtain a fine-particle-dispersed polyol intermediate (Bn) or the fine-particle-dispersed polyol (I), where n represents an integer of 3 to 7, wherein (P1) have a volume-average particle diameter (R1) of 0.01 μm to 1.0 μm, and a concentration of (b) in the step (1) is 7 wt % to 40 wt %. Thus, a method for producing a fine-particle-dispersed polyol can be provided that contains polymer fine particles dispersed in a polyol having a small particle diameter, and that, when it is used for forming a polyurethane resin, allows the polyurethane resin to exhibit excellent resin properties.

22 Claims, No Drawings

(56) References Cited

U.S. PATENT DOCUMENTS

2011/0301256 A1 12/2011 Nakada et al.
2011/0301257 A1 12/2011 Nakada et al.

FOREIGN PATENT DOCUMENTS

| | | |
|---|---|---|
| EP | 589 051 | 10/2005 |
| JP | 45-1474 | 1/1970 |
| JP | 53-85896 | 7/1978 |
| JP | 55-31880 | 3/1980 |
| JP | 62-36052 | 8/1987 |
| JP | 5-59134 | 3/1993 |
| JP | 5-148328 | 6/1993 |
| JP | 6-172462 | 6/1994 |
| JP | 7-196749 | 8/1995 |
| JP | 8-54752 | 2/1996 |
| JP | 8-067725 | 3/1996 |
| JP | 8-100006 | 4/1996 |
| JP | 8-333508 | 12/1996 |
| JP | 9-77968 | 3/1997 |
| JP | 9-124750 | 5/1997 |
| JP | 9-309937 | 12/1997 |
| JP | 10-195150 | 7/1998 |
| JP | 10-292018 | 11/1998 |
| JP | 11-130979 | 5/1999 |
| JP | 11-236499 | 8/1999 |
| JP | 2002-308920 | 10/2002 |
| JP | 2003-12706 | 1/2003 |
| JP | 2004-2800 | 1/2004 |
| JP | 2004-263192 | 9/2004 |
| JP | 2005-162791 | 6/2005 |
| JP | 2005-526155 | 9/2005 |
| JP | 2006-16611 | 1/2006 |
| JP | 2006-104236 | 4/2006 |
| JP | 2006-188685 | 7/2006 |
| JP | 2006-328261 | 12/2006 |
| JP | 2007-39677 | 2/2007 |
| JP | 2007-191682 | 8/2007 |
| WO | 01/09242 | 2/2001 |
| WO | 2007/007592 | 1/2007 |
| WO | WO2008/084625 | 7/2008 |
| WO | 2008/146614 | 12/2008 |

\* cited by examiner

METHOD FOR PRODUCING FINE-PARTICLE-DISPERSED POLYOL, AND METHOD FOR PRODUCING POLYURETHANE RESIN

TECHNICAL FIELD

The present invention relates to a method for producing a fine-particle-dispersed polyol, and a method for producing a polyurethane resin in which the fine-particle-dispersed polyol obtained by the foregoing method is used. More specifically, the present invention relates to a method for producing a fine-particle-dispersed polyol suitable as a material for a polyurethane (a polyurethane foam and a polyurethane elastomer), and a method for producing a polyurethane resin in which a fine-particle-dispersed polyol obtained by the foregoing method is used.

BACKGROUND ART

A fine-particle-dispersed polyol is used for the purpose of improving physical properties, for example, compressive hardness and durability, of a polyurethane foam, and is obtained by polymerizing an ethylenically unsaturated monomer in a polyol in the presence of a polymerization initiator. In recent years, a polyol in which fine particles having a small average particle diameter are dispersed has been demanded for the purpose of further improving mechanical properties such as elongation at break. Known methods to decrease the particle diameter include a method of increasing a ratio of acrylonitrile as a part of an ethylenically unsaturated monomer used (see Patent Document 1), which includes a process in which a seed dispersion composed of preliminarily formed submicron particles is prepared in polymerization in the first step, and a monomer is added to the seed dispersion and polymerized in the second step so that a desired polymer concentration is obtained. Still further, another method also is known in which a fine-particle-dispersed polyol is obtained by carrying out polymerization in the presence of, as an intermediate material, a seed dispersion with preliminarily-formed submicron particles dispersed therein, (see Patent Document 2).

Patent Document 1: JP 6(1994)-172462 A
Patent Document 2: JP 2005-526155 A (WO 03/097710 A1)

DISCLOSURE OF INVENTION

Problem to be Solved by the Invention

If the fine-particle-dispersed polyol obtained by the method of Patent Document 1 is used, however, the following problem occurs: if it is used for forming a slab foam, scorching tends to occur owing to a high ratio of acrylonitrile in the polymer fine particles. Further, in the case of the method according to Patent Document 2, the following problem occurs: because a large amount of a so-called coupled polyol, which is a high-molecular-weight polyol obtained by coupling polyols with use of isocyanate, is used in a polyol that serves as a site in which polymerization occurs when preliminarily-formed seed dispersion is formed, the fine-particle-dispersed polyol has a high viscosity, and a polyurethane foam obtained by using this fine-particle-dispersed polyol has insufficient mechanical properties such as elongation at break.

Means for Solving Problem

The inventors of the present invention have made earnest studies to solve the above-described problems. As a result, they found that the foregoing problems can be solved by carrying out a multi-step polymerization under specific conditions. Thus, they arrived at the present invention.

To be more specific, the present invention has the following three aspects.

[1] A method for producing a fine-particle-dispersed polyol (I) containing polymer fine particles (P) dispersed therein, the method comprising the steps of:

(1) polymerizing an ethylenically unsaturated monomer (b) in a polyol (a), in the presence of fine particles (P1) and a radical polymerization initiator (c), and in the presence of a dispersant (d) and/or a diluent (f) as required, so as to obtain a fine-particle-dispersed polyol intermediate (B2); and (n−1) polymerizing (b) in a fine-particle-dispersed polyol intermediate (B(n−1)), in the presence of (c), and in the presence of (d) and/or (f) as required, so as to obtain a fine-particle-dispersed polyol intermediate (Bn) or the fine-particle-dispersed polyol (I), where n represents an integer of 3 to 7, wherein (P1) have a volume-average particle diameter (R1) of 0.01 to 1.0 μm, and a concentration of (b) in the step (1) on the basis of a total weight of (a), (P1), (b), (c), (d), and (f) is 7 to 40 percent by weight (wt %).

[2] A method for producing a fine-particle-dispersed polyol (I) containing polymer fine particles (P) dispersed therein, the method comprising the step of:

polymerizing an ethylenically unsaturated monomer (b) in a fine-particle-dispersed polyol intermediate (B1) composed of a polyol (a) and fine particles (P1) dispersed in the polyol (a), in the presence of a radical polymerization initiator (c), and in the presence of a dispersant (d) and/or a diluent (f) as required, wherein a volume-average particle diameter (R1) of (P1) is 0.01 to 1.0 μm, and a concentration of (b) on the basis of a total weight of (B1), (b), (c), (d), and (f) is 7 to 30 wt %.

[3] A method for producing a polyurethane by causing a polyol component and an isocyanate component to react with each other, wherein the polyol component contains 10 to 100 wt % of the fine-particle-dispersed polyol (I) obtained by the method [1] or [2] on the basis of a weight of the polyol component.

Effects of the Invention

The producing method of the present invention makes it possible to obtain a polyol in which fine particles having a sufficiently small particle diameter are dispersed. The polyurethane resin of the present invention in which this fine-particle-dispersed polyol is used is free from such a problem as the occurrence of scorching, and is excellent in mechanical strengths such as elongation at break. Further, the producing method of the present invention also makes it possible to obtain a fine-particle-dispersed polyol having a low viscosity.

DESCRIPTION OF THE INVENTION

In the present invention, the fine particles (P1) is not limited particularly as long as the fine particles (P1) are made of an inorganic or organic particulate material, and one type of the same may be used alone or two or more types may be used in combination according to the purpose. In other words, the fine particles (P1) may be inorganic fine particles (PA1), organic fine particles (PA2), or a combination of (PA1) and (PA2).

Examples of the inorganic fine particles (PA1) include inorganic particles of the following materials: metal oxides such as silica, diatomaceous earth, alumina, zinc oxide, titania, zirconia, calcium oxide, magnesium oxide, iron oxide, copper oxide, tin oxide, chromium oxide, antimony oxide, yttrium oxide, cerium oxide, samarium oxide, lanthanum oxide, tantalum oxide, terbium oxide, europium oxide, neodymium oxide, and ferrite; metal hydroxides such as calcium hydroxide, magnesium hydroxide, aluminum hydroxide, basic magnesium carbonate, and hydrotalcite; metal carbonates such as heavy calcium carbonate, precipitated calcium carbonate light, zinc carbonate, barium carbonate, and dawsonite; metal sulfates such as calcium sulfate, barium sulfate, and gypsum fiber; metal silicates such as calcium silicate (wollastonite, xonotolite), kaolin, clay, talc, mica, montmorillonite, bentonite, activated clay, sepiolite, imogolite, sericite, glass fiber, glass beads, and glass flakes; metal nitride such as aluminum nitride, boron nitride, and silicon nitride; metal titanates such as potassium titanate, calcium titanate, magnesium titanate, barium titanate, and lead titanate zirconate aluminum borate; metal borates such as zinc borate, and aluminum borate; metal phosphates such as tricalcium phosphate; metal sulfides such as molybdenum sulfide; metal carbides such as silicon carbide; carbons such as carbon black, graphite, and carbon fiber; and metals such as gold and silver. As (PA1), one material may be used alone, or two or more materials may be used, according to the purpose.

Preferable as (PA1) are metal oxides, metal hydroxides, metal carbonates, metal sulfates, metal silicates, metal nitrides, metal titanates, metal borates, metal phosphates, metal sulfides, and carbons.

Examples of the organic fine particles (PA2) include known organic resin fine particles (PA21) made of the following materials: vinyl resins, urethane resins, epoxy resins, polyester resins, polyamides, polyimides, silicone resins, fluorine resins, phenol resins, melamine resins, benzoguanamine resins, urea resins, aniline resins, ionomer resins, polycarbonate, cellulose, and mixtures of these. Examples of the same also include organic wax fine particles (PA22) made of ester waxes (carnauba wax, montan wax, rice wax, etc.); polyolefin waxes (polyethylene, polypropylene, etc.), paraffin waxes, ketone waxes, ether waxes, long-chain aliphatic alcohols, long-chain aliphatic acids, and mixtures of the same; and fine particles of metal salts of long-chain aliphatic acids (PA23). Further, fine particles of various organic dyes or organic pigments such as azo compounds, phthalocyanine, condensation polycyclic compounds, and dyeing lakes, which are used as coloring agents usually, can be used. As (PA2), one type of these may be used alone, or two or more types may be used in combination according to the purpose.

Preferable as (PA2) are vinyl resins, urethane resins, epoxy resins, polyester resins, fluorine resins, silicone resins, melamine resins, and benzoguanamine resins.

The fine particles (P1) may be used without modification, or may be used with their surfaces being modified by, for example, any one of the following treatments so that adsorptivity with respect to a polymer is provided: a surface treatment with use of a coupling agent such as silane, titanate, or aluminate (a silane coupling agent, a titanium coupling agent, a sililation reagent, and organic metal compounds such as alkyl lithium, alkyl aluminum, etc.) (the method disclosed by JP 11(1999)-130979 A, etc.); a surface treatment with use of a surfactant of any type (the method disclosed by JP 8(1996)-54752 A, etc.); and a coating treatment with a wax or a polymer (the method disclosed by JP 2006-328261 A, etc.).

The fine particles (P1) preferably are selected from (PA0, (PA21), (PA23), and mixtures of two or more of these.

The fine particles (P1) are more preferably fine particles made of a material selected from metal oxides, metal carbonates, metal silicates, and (PA21); further more preferably, from silica, diatomaceous earth, heavy calcium carbonate, precipitated calcium carbonate light, kaolin, clay, talc, mica, bentonite, activated clay, urethane resins, vinyl resins, and polyester resins; still further preferably, from heavy calcium carbonate, precipitated calcium carbonate light, diatomaceous earth, talc, clay, activated day, and vinyl resins; and most preferably, from polymers obtained by polymerization of ethylenically unsaturated monomers (b) that will be described later.

The fine particles (P1) have a volume-average particle diameter (R1) of 0.01 μm to 1.0 μm. A lower limit of this range is preferably 0.05 μm, and particularly preferably 0.1 μm, from the viewpoint for a low viscosity. An upper limit of this range is preferably 0.7 μm, and particularly preferably 0.5 μm, from the viewpoint of the elongation at break of the urethane foam.

The volume-average particle diameter (R1) of the fine particles (P1) can be adjusted appropriately in the above-described particle diameter range so that the fine particles (P1) have a particle diameter suitable for allowing the polymer fine particles (P) having a desired volume-average particle diameter (R) to be obtained. For example, in the case where polymer fine particles having a volume-average particle diameter of 1 μm are to be obtained, the fine particles (P1) used preferably have a volume-average particle diameter (R1) of 0.05 to 0.7 μm, and particularly preferably 0.1 to 0.5 μm. In the case where polymer fine particles having a volume-average particle diameter of 0.5 μm are to be obtained, the (R1) of the used (P1) is preferably 0.01 to 0.4 μm, and particularly preferably 0.05 to 0.3 μm. It should be noted that the volume-average particle diameter (R) refers to a volume-average particle diameter of the polymer fine particles (P).

In the present invention, the polymer fine particles (P) may have a configuration such that all of the (P) are polymer-made fine particles, but the configuration thereof is not limited to this. The range of the polymer fine particles (P) referred to herein is intended to cover fine particles formed with the above-described fine particles (P1) and a polymer obtained by polymerization of the ethylenically-unsaturated monomer (b). More specifically, the range of the polymer fine particles (P) referred to herein is intended to cover fine particles having a configuration such that the above-described fine particles (P1) and the above-described polymer of ethylenically unsaturated monomer (b) are integrally coupled with each other, for example, fine particles having a configuration such that a layer of a polymer of an ethylenically-unsaturated monomer (b) covers a surface of each fine particle (P1); fine particles having a configuration such that a polymer of the ethylenically-unsaturated monomer (b) is bonded with a part of a surface of each fine particle (P1); or fine particles having a configuration such that a plurality of fine particles (P1) are bonded with one another via a polymer of the ethylenically-unsaturated monomer (b) interposed between the fine particles (P1). In the case where a material forming the fine particles (P1) is a material composed of organic resin particles like (PA21), the polymer fine particles (P) are equivalent to fine particles, all of which are fine particles made of a polymer. As the fine particles (P1), in particular, fine particles made of a polymer obtained by polymerization of an ethylenically-unsaturated monomer (b) are used preferably, as described above.

It should be noted that the volume-average particle diameter (R1) of (P1) and the volume-average particle diameter (R) of the polymer fine particles (P) preferably satisfy the relational expressions of Formulae (1) and (2) shown below, from the viewpoint of the physical properties of the urethane resin obtained with use of the fine-particle-dispersed polyol. Regarding Formula (1), it is more preferable that Formula (1') shown below is satisfied, and it is particularly preferable that Formula (1") shown below is satisfied. Regarding Formula (2), it is more preferable that Formula (2') shown below is satisfied, and it is particularly preferable that Formula (2") shown below is satisfied.

[Formulae 1]

$$(R) \leq (2.0) \times (R1) \times \sqrt[3]{[(V)/(Q)]} \quad (1)$$

$$(R) \geq (R1) \quad (2)$$

$$(R) \leq (1.8) \times \sqrt[3]{[(V)/(Q)]} \quad (1')$$

$$(R) \leq (1.6) \times (R1) \times \sqrt[3]{[(V)/(Q)]} \quad (1'')$$

$$(R) \geq (1.1) \times (R1) \quad (2')$$

$$(R) \geq (1.2) \times (R1) \quad (2'')$$

where R represents a volume-average particle diameter of the polymer fine particles (P); R1 represents a volume-average particle diameter of the fine particles (P1); V represents a content (percent by volume (vol %)) of fine particles in fine-particle-dispersed polyol (I); and Q represents [{weight of (P1)×specific gravity of (P1)}/{weight of (I)×specific gravity of (I)}].

It should be noted that a volume-average particle diameter can be determined by a laser diffraction/scattering particle size distribution analyzer (e.g., LA-750, manufactured by HORIBA Ltd.).

That Formula (2) is satisfied means that (P1) having a (R1) smaller than (R) is used, and in turn, in order to satisfy Formula (2), such (P1) satisfying this relationship should be selected.

That Formula (1) is satisfied means that a portion in the polymer fine particles (P) originating from the fine particles (P1) has a specific ratio, which means that an amount of an ethylenically-unsaturated monomer (b) used in the polymerization process exhibits a specific relationship with respect to an amount of the fine particles (P1) used By satisfying Formulae (1) and (2), a polyol in which fine particles having a sufficiently small diameter are dispersed can be obtained. A polyurethane resin of the present invention in which the foregoing polyol is used is free from a problem such as the occurrence of scorching, and a fine-particle-dispersed polymer polyol having excellent mechanical strengths such as elongation at break tends to be obtained.

In order to satisfy Formula (1), a ratio between the amount of the fine particles (P1) used and the amount of the ethylenically-unsaturated monomer (b) used may be adjusted. In other words, if Formula (1) is not satisfied, the amount of the fine particles (P1) used may be increased, or the amount of the ethylenically-unsaturated monomer (b) used may be decreased, for the adjustment of the ratio therebetween.

In the present invention, contents (vol %) of fine particles are determined by the following method (it should be noted that V1 represents a content of fine particles (P1) in (B1), Vn represents a content of polymer fine particles (Pn) in (Bn), and (V) represents a content of polymer fine particles (P) in (I)).

<Method for Determining Content (vol %) of Fine Particles>

About 5 g of a fine-particle-dispersed polyol intermediate (Bn) or a fine-particle-dispersed polyol (I) is weighed precisely in a 50-ml centrifuge tube, and this weight is assumed to be a fine-particle-dispersed polyol weight (W1). This is diluted with 50 g of methanol added thereto. Using a refrigerated centrifuge [model: H-9R, manufactured by Kokusan Co., Ltd.], centrifugation is performed at 20° C., 18,000 rpm for 60 minutes. Supernatant fluid is removed with a glass pipette. Residual sediment is diluted with 50 g of methanol added thereto, and subjected to centrifugation and removal of supernatant fluid as described above, which operations are repeated three more times. The residual sediment in the centrifuge tube is dried under a reduced pressure of 2,666 to 3,999 Pa (20 to 30 torr), at 60° C., for 60 minutes, the weight of the sediment thus dried is measured, and this weight is assumed to be "(W2)". The value determined by calculation of the following expression is assumed to be the content (vol %) of fine particles:

$$\text{Content of fine particles (vol \%)} = \frac{(W2)/(\text{specific gravity of particles})}{(W1)/(\text{specific gravity of fine-particle-dispersed polyol intermediate } (Bn) \text{ or specific gravity of fine-particle-dispersed polyol}(I))} \times 100$$

The specific gravity of particles can be determined by the method according to JIS-Z8807. As to the specific gravity of particles, an absolute specific gravity is used in the case where there is no enclosed void in the inside of each of particles, such as porous particles or spherical particles, whereas a bulk specific gravity is used in the case where there is an enclosed void in the inside of each of particles such as hollow particles.

The specific gravity of the fine-particle-dispersed polyol intermediate (Bn) or the fine-particle-dispersed polyol (I) can be determined by a method using a "hydrometer" according to JIS-B7525.

In the present invention, a known polyol (e.g., those disclosed by JP 2007-191682 A and JP 2004-002800 A (corresponding to US 2005/245724 A1)) usually used for producing a fine-particle-dispersed polyol may be used as the polyol (a). Examples of the polyol (a) include compounds (a1) having a structure obtained by adding alkylene oxide to a compound having at least 2 (preferably 2 to 8 from the viewpoint of the physical properties of the polyurethane resin) active hydrogen atoms (polyhydric alcohols, polyhydric phenols, amines, polycarboxylic acids, phosphoric acids, etc.), and mixtures of these. Among these, preferred are compounds having a structure obtained by adding alkylene oxide to a polyhydric alcohol, from the viewpoint of the productivity upon the production of polyurethane.

As the alkylene oxide added to the active hydrogen-containing compound, alkylene oxides having 2 to 8 carbon atoms are preferred, from the viewpoint of the physical properties of the polyurethane resin. Examples of such alkylene oxides include ethylene oxide (hereinafter abbreviated as EO), propylene oxide (hereinafter abbreviated as PO), 1,2-, 1,3-, 1,4-, and 2,3-butylene oxides (hereinafter abbreviated as BO), styrene oxide (hereinafter abbreviated as SO), and the like, and combinations of two or more of these (block addition and/or random addition). Preferably, PO or a combination of PO and EO (containing not more than 25% of EO) is used, from the viewpoint of the physical properties of the polyurethane resin. It should be noted that "%" hereinbefore and hereinafter refers to "percent by weight (wt %)" unless otherwise provided.

Specific examples of the polyol include known polyols (e.g., those disclosed by JP 2007-191682 A and JP 2004-002800 A (corresponding to US 2005/245724 A1)), and are an adduct obtained by adding PO to the above-described active hydrogen-containing compound, and an adduct obtained by adding PO and other alkylene oxide (hereinafter abbreviated as AO), preferably AO, to the active hydrogen-containing compound in a manner as described below, or an esterification product of such an adduct compound with a polycarboxylic acid or a phosphoric acid:

(1) block addition of PO-AO in this order;
(2) block addition of PO-AO-AO in this order;
(3) block addition of AO-PO-AO in this order;
(4) block addition of PO-AO-PO in this order;
(5) random addition of mixed PO and AO; or
(6) random addition or block addition according to the order described in the specification of U.S. Pat. No. 4,226,756.

Furthermore, from the viewpoint of the physical properties of the polyurethane resin, a hydroxyl equivalent of the compound (a1) is preferably 200 to 4,000, more preferably 400 to 3,000. Two or more types of compounds (a1) in combination having a total hydroxyl equivalent in the foregoing range are preferably used as well.

Further, examples of the polyol (a) also include other polyols (a2) and mixtures of the same.

As the polyol (a), a combination of the compound (a1) and another polyol (a2) may be used. In this case, the ratio (by weight) of (a1)/(a2) used is preferably 100/0 to 80/20, from the viewpoint of the physical properties of the polyurethane resin.

Examples of the polyol (a2) include known polyols (those disclosed by JP 2007-191682 A and JP 2004-002800 A (corresponding to US 2005/245724 A1), etc.), and include macromolecular polyols such as polyester polyols, diene-type polyols, hydrogenated products of the same, hydroxyl-group-containing vinyl polymers, natural-oil-type polyols, and denatured products of natural-oil-type polyols. Examples of the same also include mixtures of these.

Such a polyol (a2) usually has 2 to 8 hydroxyl groups, and from the viewpoint of the physical properties of the polyurethane resin, preferably 3 to 8 hydroxyl groups. Such a polyol (a2) also has a hydroxyl equivalent of usually 500 to 4,000, and from the viewpoint of the physical properties of the polyurethane resin, preferably 700 to 3,000.

The number-average molecular weight (according to gel permeation chromatography (GPC); this also applies to the number-average molecular weights described below unless otherwise specified particularly) of the polyol (a) is usually at least 1,500, preferably 1,500 to 15,000, particularly preferably 1,800 to 12,000, and most preferably 2,000 to 9,000. It is preferable that the number-average molecular weight of the polyol (a) is at least 1,500, from the viewpoint of the foaming property of the produced polyurethane foam. Furthermore, when the number-average molecular weight of (a) is not more than 15,000, the viscosity of the polyol (a) is low, which is preferable from the aspect of the handleability of the fine-particle-dispersed polyol. Furthermore, the polyol (a) preferably has a hydroxyl equivalent of 500 to 4000, more preferably 700 to 3000, from the viewpoint of the physical properties of the polyurethane resin.

To disperse the fine particles (P1) in the polyol (a), a dispersing apparatus can be used.

The dispersing apparatus is not limited particularly as long as it is an emulsifying machine or a dispersing machine as usually used, and examples of the same include batch-type emulsifying machines such as "Homogenizer" (manufactured by IKA), "POLYTRON" (manufactured by Kinematica AG), and "TK autohomomixer" (manufactured by TOKUSHU KIKA INDUSTRIES, Ltd. (currently PRIMA Corporation)); continuous-type emulsifying machines such as "Ebara Milder" (manufactured by Ebara Corporation), "T.K. FILMICS", "T.K. Pipeline Homomixer" (manufactured by TOKUSHU KIKA INDUSTRIES, Ltd. (currently PRIMIX Corporation)), "Colloid Mill" (manufactured by Shinko Pantec Co., Ltd. (currently Kobelco Eco-Solutions Co., Ltd.)), slashers, "Trigonal Wet Micropulverizer" (manufactured by Mitsui Miike Kakoki Co.), "Capitron" (manufactured by Eurotech Co., Ltd.), and "Fine Flow Mill" (manufactured by Pacific Machinery & Engineering Co., Ltd.); high-pressure emulsifying machines such as "MicroFluidizer" (manufactured by Mizuho Industrial Co., Ltd.), "Nanomizer" (manufactured by Nanomizer Inc.), and "AVP Gaulin" (manufactured by Gaulin Inc.); membrane emulsifiers such as "Membrane Emulsifier" (manufactured by REICA Co., Ltd.); vibration emulsifiers such as "VIBRO MIXER" (manufactured by REICA Co.); and ultrasonic emulsifiers such as an ultrasonic homogenizer (manufactured by BRANSON). Among these, preferable from the viewpoint of making the particle diameter uniform are "AVP Gaulin", "Homogenizer", "T.K. autohomomixer" "Ebara Milder", "T.K. FILMICS", and "T.K. Pipeline Homomixer".

The fine particles (P1) may be dispersed preliminarily in a diluent (f) that will be described later; in a non-aqueous organic solvent (halogenated hydrocarbons such as methyl chloride, methyl bromide, methyl iodide, methylene dichloride, carbon tetrachloride, trichloroethylene, and perchloroethylene; esters or ester ethers such as ethyl acetate, butyl acetate, methoxybutyl acetate, methyl cellosolve acetate, and ethyl cellosolve acetate; ethers such as diethyl ether, tetrahydrofuran, dioxane, ethyl cellosolve, butyl cellosolve, and propylene glycol monomethylether; ketones such as acetone, methyl ethyl ketone, methyl isobutyl ketone, di-n-butyl ketone, and cyclohexanone; alcohols such as 2-ethyl hexyl alcohol, and benzyl alcohol; amides such as dimethyl formamide, and dimethyl acetamide; sulfoxides such as dimethyl sulfoxide; and heterocyclic compounds such as N-methylpyrrolidone); or in an aqueous solvent (such as water, methanol, ethanol, isopropanol, or butanol).

Preferably, the fine particles (P1) are dispersed preliminarily in the polyol (a).

More specifically, in the present invention, when the ethylenically-unsaturated monomer (b) is polymerized, the polymerization may be carried out in the polyol (a) in the presence of the fine particles (P1) and the radical polymerization initiator (c). The fine particles (P1) may be dispersed in the polyol (a) preliminarily and introduced in a polymerization reactor, or the polyol (a) and the fine particles (P1) (or a dispersion solution in which the fine particles (P1) are dispersed preliminarily in the diluent (f)) may be introduced separately into a polymerization reactor.

In the case where the fine particles (P1) are dispersed preliminarily in the polyol (a), the content (wt %) of the fine particles is preferably 7 to 30 wt %, more preferably 10 to 25 wt %, and particularly preferably 12 to 20 wt % on the basis of the weight of (P1) and (a), from the viewpoint of the physical properties of the polyurethane resin and the particle diameter of the polymer.

When the fine particles (P1) are dispersed, the polyol (a) is preferably liquid. In the case where the polyol (a) is solid at room temperature, the fine particles (P1) may be dispersed in the polyol (a) in a liquid state at a temperature higher than the melting point thereof, or a solvent solution of the polyol (a) may be used.

The polyol (a) or the solvent solution of the same, upon dispersion of (P1) therein, preferably has a viscosity of 10 to 50,000 mPa·s (determined by a B-type viscometer), and more preferably 100 to 10,000 mPa·s, from the viewpoint of making the particle diameter uniform.

The temperature upon dispersion preferably is 0 to 150° C. (under pressure), and more preferably 5 to 98° C. When a dispersion has a high viscosity, the temperature preferably is increased so that the viscosity of the polyol (a) or the solvent solution of the same is adjusted into the above-described preferable range so that (P1) are dispersed.

As the solvent used for preparing the solvent solution of the polyol (a), the same diluent (f) as that used in polymerization that will be described later can be used.

In the case where the fine particles (P1) are dispersed in the polyol (a), a known emulsifier (e.g., those disclosed by JP 2003-12706 A), or a known dispersant used in production of a fine-particle-dispersed polyol (e.g., a dispersant (d) that will be described later) can be used.

As the emulsifier, a nonionic emulsifier, an anionic emulsifier, or an emulsifier containing both, can be used. A reactive emulsifier can be used also, and is preferable. A reactive emulsifier refers to an anionic and/or nonionic emulsifier having at least one type of an unsaturated double bond in a molecule. Examples of the same include sulfosuccinic acid ester, and alkyl phenol ether. Examples of the nonionic reactive emulsifier include those having a polyoxyethylene group in a molecule. More specifically, the examples include polyoxyethylene allyl glycidyl nonyl phenyl ether "Adekariasoap NE" (trade name, produced by Asahi Denka Co., Ltd. (currently Adeka Corporation)), and polyoxyethylene nonyl propenyl ether "Aquaron RN" (trade name, produced by Kogyo Seiyaku Co., Ltd.).

Further, (P1) can be obtained also by polymerization of the ethylenically-unsaturated monomer (b) in the polyol (a) in the presence of the radical polymerization initiator (c) and a dispersant (d) as required that will be described later. As the polymerization method, a known method that will be described later can be used.

As (P1), from the viewpoint of the storage stability of the fine-particle-dispersed polyol (I), preferable are fine particles obtained by polymerization of the ethylenically-unsaturated monomer (b) in the polyol (a) in the presence of the radical polymerization initiator (c) and the dispersant (d) as required, the dispersant (d) being described later. Further, as the ethylenically-unsaturated monomer (b), (b1) (particularly, acrylonitrile) or (b2) (particularly, styrene) is used preferably, from the viewpoint of preventing scorching of the produced polyurethane resin.

Examples of the ethylenically-unsaturated monomer (b) include known ones (e.g., those disclosed by JP 2007-191682 A and JP 2004-002800 A (corresponding to US 2005/245724 A1)), and include unsaturated nitriles (b1), aromatic-ring-containing monomers (b2), (meth)acrylic acid esters (b3), polyoxyalkylene ethers (b4) of unsaturated compounds having hydroxyl groups, other ethylenically unsaturated monomers (b5), and mixtures of two or more of these.

Examples of (b1) include acrylonitrile (hereinafter abbreviated as ACN), and methacrylonitrile.

Examples of (b2) include styrene (hereinafter abbreviated as St), α-methyl styrene, hydroxy styrene, and chlorostyrene.

Examples of (b3) include those composed of atoms of C, H, and O exclusively, for example: alkyl (meth)acrylate esters (the number of carbon atoms in the alkyl group: 1 to 24) such as methyl (meth)acrylate, butyl (meth)acrylate, nonyl (meth)acrylate, decyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, octadecyl (meth)acrylate, eicosyl(meth)acrylate and docosyl(meth)acrylate; and hydroxypolyoxyalkylene mono(meth)acrylate (the number of carbon atoms in the alkylene group: 2 to 8).

It should be noted that the expression of " . . . (meth) acryl . . . " means " . . . acryl . . . and/or . . . methacryl . . . ", and this expression is used also hereinafter.

Examples of (b4) include alkylene oxide adducts of α-alkenyl-group-containing compounds and alkylene oxide adducts of unsaturated esters having hydroxyl groups. Examples of the alkylene oxide adduct of an α-alkenyl-group-containing compound include alkylene oxide adducts of terminal-unsaturated alcohol having 3 to 24 carbon atoms ("carbon atom" is hereinafter abbreviated as "C"). Examples of the terminal-unsaturated alcohol include allyl alcohol, and 1-hexene-3-ol. Examples of an AO adduct of unsaturated ester having a hydroxyl group include AO adducts of unsaturated esters having hydroxyl groups having 3 to 24 Cs. Examples of an unsaturated compound having a hydroxyl group include hydroxyethyl (meth)acrylate, and hydroxypropyl (meth)acrylate. From the viewpoint of the particle stability, alkylene oxide adducts of allyl alcohols, and AO adducts of hydroxyalkyl (meth)acrylate (hydroxyalkyl having 2 to 12 Cs) are preferable.

The number of oxyalkylene units in (b4) is preferably 1 to 9 from the viewpoint of the particle stability, more preferably 1 to 5, and further preferably 1 to 3. Examples of the alkylene oxide include those mentioned as alkylene oxides to be added to the active hydrogen-containing compounds in the section of the polyol (a). From the viewpoint of the particle stability, preferably, the alkylene oxide is PO and/or EO.

The number-average molecular weight of (b4) is preferably 170 to 480, more preferably 180 to 450, particularly preferably 182 to 420, and most preferably 185 to 400. When the number average molecular weight is not less than 170, the fine-particle-dispersed polyol has a lower viscosity, which is preferable from the viewpoint of the handleability, and also a polyurethane resin obtained using the same has excellent hardness. When the number average molecular weight of (b4) is not more than 480, a polyurethane resin obtained using the same is excellent in hardness.

The number of unsaturated groups in (b4) may be at least one in average. From the viewpoint of the viscosity of the fine-particle-dispersed polyol and the physical properties of the polyurethane resin, the number of unsaturated groups is preferably one to ten, more preferably one to two, and particularly preferably one.

Further, (b4) preferably has a solubility parameter (SP value) of 9.5 to 13, more preferably 9.8 to 12.5, and further preferably 10.0 to 12.2. When the SP value of (b4) is not less than 9.5, a fine-particle-dispersed polyol produced using the same has a lower viscosity. When the SP value is not more than 13, a polyurethane resin obtained using the fine-particle-dispersed polyol has an improved compressive hardness.

The SP value is expressed by the square root of the ratio of a cohesive energy density to a molar volume as follows:

$$[SP\text{ value}] = (\Delta E/V)^{1/2}$$

In the above equation, $\Delta E$ indicates a cohesive energy density, and V indicates a molecular volume. The value of V is determined by the calculation of Robert F. Fedors et al., which is described, for example, in *Polymer Engineering and Science,* Volume 14, pages 147 to 154.

Examples of the ethylenically unsaturated monomer (b5) other than those described above include (meth)acrylamide; vinyl-group-containing carboxylic acids such as (meth) acrylic acid, and derivatives of the same; aliphatic hydrocarbon monomers such as ethylene and propylene; fluorine-containing vinyl monomers, such as perfluorooctylethyl methacrylate and perfluorooctylethyl acrylate; nitrogen-containing vinyl monomers other than those described above, such as diaminoethyl methacrylate and morpholinoethyl methacrylate; vinyl-modified silicone; and cyclic olefin compounds, such as norbornene, cyclopentadiene, and norbornadiene.

Further, a small amount of a multifunctional monomer (b6) having two or more functional groups, other than those described above, may be used in (b), whereby the dispersion stability of the fine-particle-dispersed polyol can be improved further. Examples of the multifunctional monomer include divinylbenzene, ethylene di(meth)acrylate, polyalkylene oxide glycol di(meth)acrylate, pentaerythritol triallyl ether, trimethylolpropane tri(meth)acrylate, ester of an unsaturated carboxylic acid having a number-average molecular weight of not less than 500 and a glycol, and ester of an unsaturated alcohol and a carboxylic acid, as described in WO 01/009242 (corresponding to US 2003/004217 A1).

In the present invention, the respective ratios by weight of (b1), (b2), (b3), (b4), (b5), and (b6) in (b) are not limited particularly, and an excellent fine-particle-dispersed polyol (I) can be obtained by the producing method of the present invention, irrespective of the composition of monomer. The ratio however may be adjusted appropriately according to the required properties of a polyurethane to be obtained, and the like.

The content of the polyoxyalkylene ether (b4) of an unsaturated compound having a hydroxyl group in (b) is preferably 0.5 to 10 wt %, and more preferably 1 to 7 wt %, with a view toward decreasing the viscosity of a fine-particle-dispersed polyol (I), and from the viewpoint of the physical properties (tensile strength, etc.) of the polyurethane resin to be obtained.

In regard to the resistance to scorching, the content of unsaturated nitrile (b1) (particularly, acrylonitrile) in (b) is preferably not more than 50 wt %, and more preferably 15 to 40 wt %.

With a view toward decreasing the particle diameter of polymer fine particles in (I), the content of the aromatic-ring-containing monomer (b2) (particularly, styrene) in (b) is preferably not more than 99.5 wt %, more preferably 20 to 90 wt %, and particularly preferably 35 to 80 wt %.

The contents of monomers other than those described above in (b) are as follows from the viewpoint of the physical properties of the polyurethane resin: the content of (b3) is preferably 0 to 30 wt %, and more preferably 0 to 20 wt %; the content of (b5) is preferably 0 to 10 wt %, and more preferably 0 to 5 wt %; and the content of (b6) is preferably 0.01 to 0.7 wt %, and more preferably 0.05 to 0.4 wt %.

As the radical polymerization initiator (c), a compound that generates a free radical to initiate polymerization may be used Examples of the same include known ones (those disclosed by JP 2007-191682 A, JP 2004-002800 A (corresponding to US 2005-245724 A1), etc.), which are, for example, azo compounds, organic peroxides, and inorganic peroxides. Two or more may be used in combination.

The radical polymerization initiator (c) preferably includes an azo compound (c1) satisfying the relational expression of Formula (3) shown below and a peroxide (c2) satisfying the relational expression of Formula (4) shown below. With a view to decreasing residual monomers after polymerization, (c1) is more preferably an azo compound satisfying the relational expression of Formula (3'), and further more preferably an azo compound satisfying the relational expression of Formula (3"). With a view to decreasing residual monomers after polymerization, (c2) is more preferably a peroxide satisfying the relational expression of Formula (4') shown below, and further more preferably a peroxide satisfying the relational expression of Formula (4") shown below.

$$(Tp-100) \leq Th \leq (Tp-55) \tag{3}$$

$$(Tp-50) \leq Th \leq (Tp+20) \tag{4}$$

$$(Tp-90) \leq Th \leq (Tp-55) \tag{3'}$$

$$(Tp-80) \leq Th \leq (Tp-55) \tag{3"}$$

$$(Tp-50) \leq Th \leq (Tp-5) \tag{4'}$$

$$(Tp-50) \leq Th \leq (Tp-20) \tag{4"}$$

where Tp represents a polymerization temperature (° C.), and Th represents a 10-hour half-value-period temperature (° C.) of the radical polymerization initiator.

Here, the "10-hour half-value-period temperature" of the radical polymerization initiator refers to a temperature at which over 10 hours an amount of the undecomposed radical polymerization initiator decreases to half of the original amount of the radical polymerization initiator before decomposition.

Preferably (c2) exhibits a hydrogen abstraction ability of 0 to 30%, more preferably 0 to 28%, and further more preferably 0 to 25%, from the viewpoint of the viscosity of the fine-particle-dispersed polyol.

It should be noted that the "hydrogen abstraction ratio" refers to a value derived from an amount of a cyclohexane-α-methyl styrene dimer ("α-methyl styrene dimer" is hereinafter abbreviated as "MSD") addition product (hereinafter abbreviated as "CH-MSD") generated when cyclohexane and MSD were caused to react with each other at 140° C. for 6 hours in the presence of (c2), which is determined by a method according to the measurement method described in "Polymer Journal" Vol. 29, No. 4, pp. 366-369. The value is determined by, for example, the following method.

<Method of Reaction Between Cyclohexane and MDS>

In a 100 ml SUS-made autoclave, 0.1 mole (23.6 g) of MSD, 0.69 mole (53.8 g) of cyclohexane, and 0.005 mole of (c2) are placed, and are caused to react for 24 hours in a thermostat (forced convection constant temperature oven manufactured by Yamato Scientific Co. Ltd., model: DNM 400) preliminarily set at 140° C. After the completion of the reaction, it is left in a room at 25° C. so as to be cooled, and the contents are removed from the autoclave when the temperature thereof becomes 40° C. or lower.

<Quantitation Method for Cyclohexane-MSD Addition Product>

The generated CH-MSD is quantitated by gas chromatography (hereinafter abbreviated as "GC"). Conditions for GC are described below.

<GC Conditions>
Device: Gas chromatograph GC-2014 manufactured by Shimadzu Corporation
Column: ZB-5 (length: 30 m, inner diameter: 0.32 mm, film thickness: 0.25 μm) manufactured by Phenomenex
Vaporization chamber temperature: 200° C.
Detector temperature: 210° C.
Column initial temperature: 90° C.
Column temperature increase rate: 10° C./min
Column final temperature: 280° C.
Sample concentration: using a sample resulting from the above-described reaction, a 50 wt % cyclohexane solution thereof is prepared, which is used as a measurement sample.

It should be noted that a peak position (retention time) of CH-MSD is checked preliminarily using a gas chromatography mass spectrometer (GCMS).
<GCMS Condition>
Device: Quadropole-type mass spectrometer (GCMS QP-5000) manufactured by Shimadzu Corporation
<GC Conditions>: the Same as Above
<MS Conditions>
Mass range at measurement start: EI 33 to 600
Scanning interval (I): 0.1 sec
Threshold value (T): 1000
Solvent eluting time: 0.05 min
Measurement start time: 0.1 min
Measurement stop time: 40 min
Scan gain: 1.4 KV
<Calculation of Hydrogen Abstraction Ability>

The hydrogen abstraction ratio is calculated by the following formula using the amount of CH-MSD determined by the measurement:

$$\text{Hydrogen abstraction ability (\%)} = \frac{(\text{Number of moles of } CH\text{-}MSD)}{(\text{Logical number of moles of radicals generated from peroxide})} \times 100 \quad \text{[Formula 2]}$$

Each of (c1) and (c2) may contain a plurality of radical polymerization initiators, but from the viewpoint of the viscosity, as well as the strength of the urethane resin to be obtained, preferably contains 1 to 4 types of radical polymerization initiators, more preferably 1 to 2 types, and most preferably 1 type.

The radical polymerization initiator (c) may contain a radical polymerization initiator other than (c1) and (c2), but preferably does not contain the same from the viewpoint of the physical properties of the urethane resin.

Examples of (c1) include, apart from the compounds disclosed by JP 2005-162791 A and JP 2004-002800 A (corresponding to US 2005/245724 A1)), 2,2'-azobisisobutyronitrile, 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methyl propionate), 2,2'-azobis[2-(hydroxymethyl)propionitrile], 1,1'-azobis(1-acetoxy-1-phenylethane), and 2,2-azobis(4-methoxy-2,4-dimethylvaleronitrile).

Examples of (c2) include, apart from the compounds disclosed by JP 2005-162791 A and JP 2004-002800 A (corresponding to US 2005/245724 A1)), peroxyketals such as 1,1-di(t-hexylperoxy)cyclohexane, and 1,1-di(t-hexylperoxy)-3,3,5-trimethyl cyclohexane; alkyl peroxides such as 2,5-dimethyl-2,5-di(t-butylperoxy)hexane, di(2-t-butylperoxy isopropyl)benzene, di-t-hexyl peroxide; diacyl peroxides such as dilauroyl peroxide, and dibenzoyl peroxide; peroxy esters such as 1,1,3,3-tetramethylbutyl peroxy-2-ethyl hexanate, t-hexylperoxy-2-ethyl hexanate, t-butylperoxy-2-ethyl hexanate, t-hexylperoxy isopropyl monocarbonate, t-butylperoxy laurate, and t-hexylperoxy benzoate.

Exemplary combinations of (c1) and (c2) include, in the case where Tp is 110° C., a combination of 2,2'-azobis(2,4-dimethylvaleronitrile) (Th: 51° C.) and 1,1-di(t-hexylperoxy) cyclohexane (Th: 87° C.): in the case where Tp is 130° C., a combination of 2,2'-azobis(2-methylbutyronitrile) (Th: 67° C.) and t-hexylperoxy isopropyl monocarbonate (Th: 95° C.), a combination of 2,2'-azobis(2-methylbutyronitrile) (Th: 67° C.) and t-butylperoxy laurate (Th: 98° C.), a combination of 2,2'-azobis(2-methylbutyronitrile) (Th: 67° C.) and di-t-hexylperoxide (Th: 116° C.), and a combination of 2,2'-azobis(2,4-dimethylvaleronitrile) (Th: 51° C.) and di-t-hexylperoxide (Th: 116° C.).

An amount of the radical polymerization initiator (c) used is, on the basis of the weight of (b), preferably 0.05 to 20%, more preferably 0.1 to 5%, and particularly preferably 0.2 to 1.5%. If the amount of (c) used is in this range, a ratio of polymerization of (b) in the fine-particle-dispersed polyol is increased sufficiently, and a large molecular weight can be achieved. Therefore, a polyurethane obtained is excellent since it has sufficient mechanical strengths (e.g., a foam compressive hardness and elongation at break when it is formed into a polyurethane foam).

An amount (wt %) of (c1) used is, on the basis of the weight of (b), preferably 0.04 to 15 wt %, more preferably 0.08 to 3 wt %, and particularly preferably 0.15 to 1.5 wt %.

An amount (wt %) of (c2) used is, on the basis of the weight of (b), preferably 0.01 to 5 wt %, more preferably 0.02 to 1 wt %, and particularly preferably 0.05 to 0.5 wt %.

A ratio between the amounts (wt %) of (c1) and (c2) used (an amount (wt %) of (c1) used/an amount (wt %) of (c2) used) preferably is 0.04/1.5 to 15/0.01, more preferably 0.08/1 to 3/0.02, and particularly preferably 0.15/0.5 to 2/0.05.

The polymerization of (b) may be caused to occur in the presence of a dispersant (d) as required.

The dispersant (d) is not limited particularly, and any of known dispersants used in fine-particle-dispersed polyols (those disclosed by JP 2007-191682 A and JP 2004-002800 A (corresponding to US 2005/245724 A1), etc.) may be used.

Examples of the dispersant (d) include:

[1] macromer-type dispersants obtained by causing a polyol to react with an ethylenically unsaturated compound, such as an ethylenically unsaturated group-containing modified polyether polyol (e.g. JP 08(1996)-333508 A);

[2] graft-type dispersants obtained by combining a polyol with an oligomer, such as a graft polymer having two or more segments with an affinity for polyols as side chains, in which the difference between the solubility parameter of the side chains and the solubility parameter of a polyol is not more than 1.0, and having a segment with an affinity for polymers as a main chain, in which the difference between the solubility parameter of the main chain and the solubility parameter of a polymer formed from an ethylenically unsaturated compound is not more than 2.0 (e.g. JP 05(1993)-059134 A);

[3] high-molecular-weight polyol type dispersants, e.g. a modified polyol obtained by causing at least a portion of the hydroxyl groups in a polyol to react with a methylene dihalide and/or an ethylene dihalide to increase its molecular weight (e.g. JP 07(1995)-196749 A); and

[4] oligomer type dispersants, e.g. a vinyl oligomer with a weight-average molecular weight of 1,000 to 30,000 at least a portion of which is soluble in polyols, and a dispersant comprising this oligomer and the ethylenically unsaturated group-containing modified polyether polyol described for [1] above in combination (e.g. see JP 09(1997)-77968 A).

Among these, the types [1] and [4] are preferred, from the viewpoint of the particle diameter of the polymer fine particles (P) of the fine-particle-dispersed polyol. In any case, it is preferable that the number-average molecular weight is 1,000 to 30,000, from the viewpoint of the particle diameter of the polymer fine particles (P).

In the case where such a conventional dispersant is used, the amount of the same used is preferably 50% or less, and more preferably 1 to 40%, on the basis of the weight of (b), from the viewpoint of the viscosity of the fine-particle-dispersed polyol to be obtained.

Apart from the above-described conventional dispersant, a reactive dispersant (d') described below, which is disclosed by JP 2002-308920 A (corresponding to U.S. Pat. No. 6,756,414), JP 2007-191682 A, and JP 2004-002800 A (corresponding to US 2005/245724 A1)), can be used as the dispersant (d). This reactive dispersant (d') is preferable for the same reasons as the preferable dispersants described above.

The reactive dispersant (d') is an unsaturated polyol having a nitrogen-containing bond, the polyol being formed by bonding a substantially saturated polyol with a monofunctional active hydrogen compound having at least one polymerizable unsaturated group via a polyisocyanate, wherein an average value of a ratio of the number of unsaturated groups to the number of nitrogen-containing bonds originating from an NCO group in one molecule of the polyol is 0.1 to 0.4.

Here, "substantially saturated" means that an unsaturation degree measured by the method specified in JIS K-1557 (1970 version) is not more than 0.2 meq/g (preferably not more than 0.08 meq/g, from the viewpoint of the particle diameter of the polymer).

When the ethylenically-unsaturated monomer (b) is polymerized, the polymerization preferably is caused to occur in the presence of an active-hydrogen-containing compound (D) further, the compound (D) having an aromatic ring and having a number-average molecular weight of 150 to 2,000.

From the viewpoint of the particle diameter of the polymer fine particles in the fine-particle-dispersed polyol, the number average molecular weight of the active-hydrogen-containing compound (D) having an aromatic ring is 150 to 2,000, preferably 300 to 1,700, and more preferably 500 to 1,600. If the number-average molecular weight is less than 150 or more than 2,000, the polymer fine particles have a larger volume-average particle diameter.

The term "aromatic ring" refers to the following aromatic rings: aromatic rings in which a ring is formed with carbon atoms alone (benzene ring, naphthalene ring, etc.); and aromatic rings in which a ring is formed with carbon and nitrogen atoms (pyridine ring, etc.).

The content (wt %) of aromatic ring in (D) is preferably 4 to 90 wt %, more preferably 8 to 70 wt %, and further more preferably 10 to 50 wt %, from the viewpoint of the volume-average particle diameter of the polymer fine particles. It should be noted that the "content of aromatic rings" refers to a value obtained by dividing a total atomic weight of elements forming a ring structure by a molecular weight.

From the viewpoint of the volume-average particle diameter of the polymer particles, the number of active hydrogen atoms in (D) is preferably 1 to 3, and more preferably 1 to 2, per one molecule of (D).

Further, (D) preferably has an active hydrogen equivalent (i.e., a molecular weight of (D) per active hydrogen) of 100 to 2,000, more preferably 150 to 1,700, and most preferably 250 to 1,600, from the viewpoint of the volume-average particle diameter of the polymer particles.

Examples of (D) include aromatic-ring-containing ethers (D1), aromatic-ring-containing esters (D2), and aromatic-ring-containing urethanes (D3).

Examples of (D1) include compounds obtained by adding an alkylene oxide to a phenol such as bisphenol. Examples of phenol include monovalent phenols (cresol, naphthol, monostyrenated phenol, etc.); divalent phenols (catechol, resorcinol, bisphenol, etc.); and trivalent or higher phenols (pyrogallol, etc.). Examples of (D1) further include compounds obtained by adding an alkylene oxide to a dihydroxynaphthalene (1,4-dihydroxynaphthalene, 1,8-dihydroxynaphthalene, etc.); and compounds obtained by adding an alkylene oxide to 4,4'-dihydroxy-3,3',5,5'-tetrahydroxyphenylmethyl-2,2'-diphenylpropane.

Examples of (D2) include compounds obtained by adding an alkylene oxide to an aromatic-ring-containing carboxylic acid such as phthalic acid. Examples of the aromatic-ring-containing carboxylic acid include monovalent carboxylic acids (benzoic acid, salicylic acid, etc.); divalent carboxylic acids (phthalic acid, terephthalic acid, etc); and trivalent or higher carboxylic acids (mellitic acids, etc.).

Examples of (D3) include compounds obtained by polycondensation of an aromatic isocyanate such as tolylene diisocyanate and a polyol. Examples of an aromatic isocyanate include monovalent isocyanates (phenyl isocyanate, etc.); divalent isocyanates (tolylene diisocyanate (hereinafter abbreviated as "TDI"), 4,4'-diphenylmethane diisocyanate (hereinafter abbreviated as "MDI"), xylylene diisocyanate, etc.); and trivalent or higher isocyanates (triphenylmethane triisocyanate, tris(isocyanatephenyl)thiophosphate, polymeric MDI, etc.).

Among these, (D1) is preferred, from the viewpoint of the viscosity of (D).

Further, (D) is preferably an alkylene oxide adduct (D-1) of the active-hydrogen-containing compound (e) that has one or more active hydrogen atoms and that has a hydroxyl equivalent and an SP value satisfying Formula (5) and Formula (6) shown below, respectively:

$$80 \leq X \leq 360 \tag{5}$$

$$-0.012 \times X + 14.0 \leq S \leq -0.012 \times X + 17.0 \tag{6}$$

where X represents the hydroxyl equivalent of the active-hydrogen-containing compound (e), and S represents the SP value of the active-hydrogen-containing compound (e).

$$90 \leq X \leq 360 \tag{5'}$$

$$-0.012 \times X + 14.0 \leq S \leq -0.012 \times X + 16.0 \tag{6'}$$

$$95 \leq X \leq 340 \tag{5''}$$

$$-0.012 \times X + 14.1 \leq S \leq -0.012 \times X + 15.8 \tag{6''}$$

$$110 \leq X \leq 310 \tag{5'''}$$

$$-0.012 \times X + 14.4 \leq S \leq -0.012 \times X + 15.7 \tag{6'''}$$

From the viewpoint of the viscosity of (D) and the particle diameter of the fine particles in the fine-particle-dispersed polyol, the hydroxyl equivalent (X) of the active-hydrogen-containing compound (e) preferably satisfies Formula (5), more preferably satisfies Formula (5'), further more preferably satisfies Formula (5"), and particularly preferably satisfies Formula (51.

Further, from the viewpoint of the particle diameter of the fine particles in the fine-particle-dispersed polyol and mechanical properties of a polyurethane resin, the relationship between the SP value and the hydroxyl equivalent of the active-hydrogen-containing compound (e) preferably satisfies Formula (6), more preferably satisfies Formula (6'), further more preferably satisfies Formula (6"), and particularly preferably satisfies Formula (6''').

The hydroxyl equivalent (X) is a value that varies with the number of hydroxyl groups possessed by the active-hydrogen-containing compound (e) and the molecular weight of (e), and the active-hydrogen-containing compound (e) having a specific number of hydroxyl groups and a specific molecular weight may be selected so that Formula (5) is satisfied.

In order that X and S satisfy Formula (6), adjustment may be made as to the number of structures that cause the SP value to increase or the number of functional groups that cause the SP value to increase, and the number of structures that cause the SP value to decrease or the number of functional groups that cause the SP value to decrease, such structures or functional groups being those other than the hydroxyl groups in (e). For example, when S is smaller than the lower limit of Formula (6), the number of structures having SP values greater than 10 or the number of functional groups having SP values greater than 10 may be increased, or the number of structures having SP values smaller than 10 or the number of functional groups having SP values smaller than 10 may be decreased, whereby adjustment may be made so that Formula (6) should be satisfied. When S is greater than the upper limit of Formula (6), the number of structures having SP values greater than 12 or the number of functional groups having SP values greater than 12 may be decreased, or the number of structures having SP values smaller than 12 or the number of functional groups having SP values smaller than 12 may be increased, whereby adjustment may be made.

That the hydroxyl equivalent (X) satisfies Formula (5) means that (e) contains appropriate amounts of hydroxyl groups, i.e., functional groups to which alkylene oxides can be added, and means that (D) having a structure in which alkylene oxides are added to the hydroxyl groups has an appropriate affinity with the polyol (a).

Further, that the hydroxyl equivalent (X) and the SP value (S) of (e) satisfy Formula (6) means that (e) has an appropriate SP value according to an amount of hydroxyl groups (i.e., functional groups to which alkylene oxides can be added) that (e) possesses. In other words, (D) having a structure in which alkylene oxides are added to (e) satisfying this relationship has appropriate affinity with the fine particles (P) according to the affinity with the polyol (a).

Therefore, (D) having a structure in which alkylene oxides are added to (e) satisfying Formulae (5) and (6) has appropriate affinity with the polyol (a) and appropriate affinity with the fine particles (P), and the balance therebetween is appropriate, which means that (D) has significantly excellent dispersibility of fine particles.

The number of active hydrogen atoms in (e) is preferably 1 to 3, and more preferably 1 to 2, per one molecule of (e), from the viewpoint of the particle diameter of the fine particles in the fine-particle-dispersed polyol.

The active-hydrogen equivalent of (e) (i.e., the molecular weight of (e) per one active hydrogen atom) is preferably 60 to 500, more preferably 80 to 450, and further more preferably 100 to 400, from the viewpoint of the particle diameter of the fine particles in the fine-particle-dispersed polyol.

Examples of (e) include the same phenols as those mentioned regarding (d1) above, including bisphenol (e1), styrenated phenol (e2), dihydroxynaphthalenes (1,4-dihydroxynaphthalene, 1,8-dihydroxynaphthalene, etc.), and 4,4'-dihydroxy-3,3',5,5'-tetrahydroxyphenylmethyl-2,2'-diphenylpropane.

Examples of (e1) include bisphenols, and examples of (e2) include monostyrenated phenols and distyrenated phenols.

Among these, (e1), dihydroxynaphthalenes (1,4-dihydroxynaphthalene, 1,8-dihydroxynaphthalene, etc.), and 4,4'-dihydroxy-3,3',5,5'-tetrahydroxyphenylmethyl-2,2'-diphenylpropane are preferred from the viewpoint of the viscosity of (D) and the particle diameter of fine particles in the fine-particle-dispersed polyol.

As alkylene oxides, the same as those mentioned above can be used, and those preferred also are the same as those mentioned above.

Examples of the alkylene oxide adduct (D-1) of the active-hydrogen-containing compound (e) that has one or more active hydrogen atoms and that has a hydroxyl equivalent and an SP value satisfying Formula (5) and Formula (6) include, specifically, bisphenol alkylene oxide adducts (D-1-1), and styrenated phenol alkylene oxide adducts (D-1-2).

Examples of (D-1-1) include compounds obtained by adding alkylene oxides to bisphenols, and examples of (D-1-2) include compounds obtained by adding alkylene oxides to monostyrenated phenols.

Among these, (D-1-1) are preferred from the viewpoint of the viscosity of (D) and the particle diameter of fine particles in the fine-particle-dispersed polyol.

The amount (wt %) of (D) used is preferably 0.1 to 20 wt %, more preferably 1 to 5 wt %, further more preferably 1 to 10 wt %, and particularly preferably 2 to 10 wt % on the basis of the weight of the ethylenically-unsaturated monomer (b), from the viewpoint of the volume-average particle diameter of the polymer fine particles, and the physical properties of the urethane resin.

The polymerization of (b) may be carried out in the presence of the diluent (f) as required. Examples of (f) include aromatic hydrocarbon solvents such as toluene and xylene; and saturated aliphatic hydrocarbon solvents having 5 to 15 carbon atoms such as hexane, heptane, and n-decane, among which the aromatic hydrocarbon solvents are preferred. The amount of the diluent (1) used is preferably not more than 50%, and more preferably 1 to 40%, on the basis of the amount of (b) used, with a view toward preventing the aggregation of particles. The diluent (f), after being used, preferably is removed by vacuum stripping or the like after the polymerization reaction.

The diluent (f) may be added further to the fine-particle-dispersed polyol (I) obtained by the method of the present invention as required, so as to make the polyol (I) have a further lower viscosity. Examples of (f) to be contained in (I) include the above-described saturated aliphatic hydrocarbon solvents; aromatic hydrocarbon solvents; and flame retardants having a low viscosity (not more than 100 mPa·s/25° C.), for instance, tris(chloroethyl)phosphate, tris(chloropropyl)phosphate, etc. However, it is preferable that (f) is not added to the fine-particle-dispersed polyol (I), from the viewpoint of decreasing volatile components in the fine-particle-dispersed polyol.

The content of (f) in the fine-particle-dispersed polyol (I) obtained is preferably not more than 2%, and more preferably not more than 1%, from the viewpoint of the physical properties of the polyurethane resin.

Further, the polymerization of (b) may be carried out in the presence of a chain transfer agent (g) as required. Examples of the chain transfer agent (g) include alkyl mercaptans, such as dodecyl mercaptan and mercaptoethanol. The amount of the chain transfer agent (g) used is preferably not more than 2%, and more preferably not more than 0.1%, on the basis of the amount of (b) used, from the viewpoint of the physical properties of the polyurethane resin.

The producing method according to the first aspect of the present invention includes the steps (1) and (n-1) shown below:

Step (1): polymerizing (b) in (a), in the presence of (P1) and (c), and in the presence of (d) and/or (f) as required, so as to obtain a fine-particle-dispersed polyol intermediate (B2); and Step (n-1): polymerizing (b) in a fine-particle-dispersed polyol intermediate (B(n-1)), in the presence of (c), and in the presence of (d) and/or (f) as required, so as to obtain a fine-particle-dispersed polyol intermediate (Bn) or a fine-particle-dispersed polyol (I), where n represents an integer of 3 to 7.

From the viewpoint of the particle diameter of polymer fine particles in the fine-particle-dispersed polyol (hereinafter this particle diameter is referred to simply as "the polymer particle diameter" in some cases), n is an integer of 3 to 7, preferably an integer of 3 to 5, and more preferably an integer of 3 to 4. If n is an integer of 8 or more, the viscosity of (I) increases. If n is an integer of 2 or less, this means that the step (n-1) is not included, and in this case, a volume-average particle diameter (R1) increases, whereby physical properties of a urethane foam produced deteriorate.

In the step (1), the concentration (wt %) of the ethylenically-unsaturated monomer (b) on the basis of the total weight of (a), (P1), (b), (c), (d), and (f) is 7 to 40 wt %, preferably 10 to 35 wt %, and more preferably 15 to 30 wt %, from the viewpoint of the physical properties of the polyurethane resin and the polymer particle diameter. If the concentration of (b) exceeds 40 wt %, the polymer particle diameter of the fine-particle-dispersed polyol obtained increases, and the physical properties of the polyurethane resin obtained using the polyol deteriorate. Hit is less than 7 wt %, the content of the polymer fine particles in the fine-particle-dispersed polyol (I) decreases, whereby the foam compressive hardness decreases.

As to the ratio between the content (wt %) of (P1) on the basis of the total weight of (a), (P1), (b), (c), (d), and (f) in the step (1) and the concentration of (b) in the step (1), the ratio of the content of (P1) in the step (1) to the concentration of (b) in the step (1) is preferably 30:7 to 7:40, more preferably 25:10 to 10:35, and particularly preferably 20:30 to 12:15, from the viewpoint of the physical properties of the polyurethane resin and the polymer particle diameter.

The ratio (wt %) of conversion of (b) into a polymer in the step (1) is, regarding the lower limit thereof, preferably not less than 75%, more preferably not less than 80%, and particularly not less than 85%, from the viewpoint of productivity. The ratio is, regarding the upper limit thereof, preferably not more than 99.5%, more preferably not more than 99.2%, and particularly preferably not more than 99% from the viewpoint of the polymer particle diameter.

In the step (n-1), the concentration of the ethylenically-unsaturated monomer (b) on the basis of the total weight of the fine-particle-dispersed polyol intermediate (B(n-1)), (b), (c), (d), and (f) is preferably 7 to 40 wt %, more preferably 10 t 35 wt %, and particularly preferably 15 to 30 wt %, from the viewpoint of the physical properties of the polyurethane resin and the viscosity of the fine-particle-dispersed polyol to be obtained.

It should be noted that if (B(n-1)) contains (b), the concentration of (b) in the step (n-1) is calculated as the concentration of (b) including the (b) contained (B(n-1)).

In the step (n-1), the polyol (a) may be added further, and in this case the foregoing concentration is calculated on the basis of the total weight including the weight of the added (a).

The ratio (wt %) of conversion of (b) into a polymer in the step (n-1) is, regarding the lower limit thereof, preferably not less than 80%, more preferably not less than 85%, and particularly preferably not less than 90% from the viewpoint of productivity. The ratio is, regarding the upper limit thereof, preferably not more than 99.5%, more preferably not more than 99.2%, and particularly preferably not more than 99%, from the viewpoint of the polymer particle diameter.

The polymerization temperature (° C.) is preferably 100 to 180° C., more preferably 110 to 160° C., and particularly preferably 120 to 140° C., from the viewpoint of productivity, and with a view toward preventing the decomposition of the polyol.

In the steps (1) and (n-1), the polymerization may be carried out by any one of methods of continuous polymerization and batch polymerization (dropping polymerization, one-step polymerization (disclosed by JP 2007-39677 A, etc.), etc.). From the viewpoint of productivity, the continuous polymerization method or the batch one-step polymerization method is used preferably.

The polymerization methods used in the step (1) and the step (n-1) may be the same or different.

The above-described "one-step polymerization method" refers to a method in which a polyol (a), and an ethylenically-unsaturated monomer (b), as well as a dispersant (d) and/or a diluent (f) as required are heated to a polymerization temperature, and thereafter a radical polymerization initiator (c) is added thereto so that polymerization occurs. Preferably (c) is added after the materials are heated to the polymerization temperature, but (c) may be mixed in the materials before the heating. Alternatively, (b) may be divided into portions so as to be added portion by portion while the cycle of the adding, the heating, and the polymerization in the stated order is repeated until an intended polymer concentration is obtained. The number of portions (number of divisions) preferably is 2 to 7, more preferably 2 to 5, particularly preferably 3 to 4, and most preferably 3. If the number of divisions is 1 to 7, the growth of polymerization particles formed therein is suppressed, which results in a sharp particle distribution by volume. At the same time, an amount of bulky polymer particles produced in the polymerization process is reduced sufficiently.

The fine-particle-dispersed polyol intermediate (Bn) obtained in the step (n-1) may be used, without any change, as the fine-particle-dispersed polyol (I), or may be subjected to a monomer-removing and solvent-removing treatment as required so that the fine-particle-dispersed polyol (I) is obtained. From the viewpoint of odors of the polyurethane resin produced using the fine-particle-dispersed polyol (I), it is preferable to carry out the monomer-removing and solvent-removing treatment.

The producing method according to the second aspect of the present invention is a method for producing a fine-particle-dispersed polyol (I), and the method includes the step of polymerizing an ethylenically unsaturated monomer (b) in a fine-particle-dispersed polyol intermediate (B1) composed of a polyol (a) and fine particles (P1) dispersed in the polyol (a), in the presence of a radical polymerization initiator (c), and in the presence of a dispersant (d) and/or a diluent (f) as required.

In the second aspect, a concentration (wt %) of the ethylenically unsaturated monomer (b) on the basis of the total weight of the fine-particle-dispersed polyol intermediate (B1), (b), (c), (d), and (f) is 7 to 30 wt %, preferably 10 to 25 wt %, and more preferably 12 to 20 wt % from the viewpoint of the physical properties of the polyurethane resin and the polymer particle diameter. If the concentration of (b) is more than 30 wt %, the diameter of polymer particles in the fine-particle-dispersed polyol obtained increases, whereby the physical properties of the polyurethane resin obtained using the foregoing polyol deteriorate. If the concentration of (b) is less than 7 wt %, the content of polymer fine particles in the fine-particle-dispersed polyol (I) decreases, whereby the compressive hardness of a polyurethane foam decreases.

It should be noted that in the second aspect, if (B1) contains (b), the concentration of (b) is calculated as the concentration of (b) including the (b) contained in (B1).

In the second aspect, the ratio between the content (wt %) of the fine particles in (B1) and the concentration of (b) upon polymerization is preferably 30:7 to 7:30, more preferably 25:10 to 10:25, and particularly preferably 20:30 to 12:20, from the viewpoint of the physical properties of the polyurethane resin and the polymer particle diameter.

In the second aspect, the ratio (wt %) of conversion of (b) into a polymer is, regarding the lower limit thereof, preferably not less than 75%, more preferably not less than 80%, and particularly preferably not less than 85%, from the viewpoint of productivity. The ratio is, regarding the upper limit thereof, preferably not more than 99.5%, more preferably not more than 99.2%, and particularly preferably not more than 99% from the viewpoint of the polymer particle diameter.

The polymerization temperature (° C.) is preferably 100 to 180° C., more preferably 110 to 160° C., and particularly preferably 120 to 140° C., from the viewpoint of productivity, and with a view toward preventing the decomposition of the polyol.

In the second aspect, the polymerization may be carried out by any one of methods of continuous polymerization and batch polymerization (dropping polymerization, one-step polymerization, etc.). From the viewpoint of productivity, the continuous polymerization method or the batch one-step polymerization method is used preferably.

The fine-particle-dispersed polyol (I) obtained in the second aspect may be used, without any change, as the fine-particle-dispersed polyol (I), or may be subjected to a monomer-removing and solvent-removing treatment as required so that the fine-particle-dispersed polyol (I) is obtained. From the viewpoint of odors of the polyurethane resin produced using the fine-particle-dispersed polyol (I), it is preferable to carry out the monomer-removing and solvent-removing treatment.

As the monomer-removing and solvent-removing treatment, any of known methods (the method disclosed by JP 2004-002800 A (corresponding to US 2005/245724 A1), etc.) can be used, among which preferred, from the viewpoint of the whiteness of the polyurethane resin, are a method of stripping residual monomers and/or the diluent (f) under a reduced pressure, and a method of removing the same by distillation under a reduced pressure while continuously adding water or steam (the method disclosed by JP 62(1987)-36052 B, etc.).

An anti-aging agent and an antioxidant may be added as required to the fine-particle-dispersed polyol (I), whereby the discoloration of the fine-particle-dispersed polyol and the discoloration of the polyurethane resin obtained using the same can be prevented. As the anti-aging agent and the antioxidant, those that are known can be used (those disclosed by JP 2006-188685 A, etc.), which include lactone, hindered phenol, phosphor-containing compounds, hindered amine, hydroxyl amine, and sulfur-containing compounds. With a view to preventing the discoloration of the polyurethane resin, lactone and hindered phenol preferably are used in combination.

The fine-particle-dispersed polyol obtained by the producing method of the present invention is a polyol in which the polymer fine particles (P) are dispersed.

In the present invention, the content (wt %) of fine particles in the fine-particle-dispersed polyol (I) obtained is preferably 35 to 60 wt %, more preferably 40 to 55 wt %, and particularly preferably 40 to 50 wt % from the viewpoint of the physical properties of the polyurethane resin obtained using the same, the elongation at break and the compressive hardness of the polyurethane foam, and the viscosity of the fine-particle-dispersed polyol.

It should be noted that in the present invention, the content (wt %) of fine particles is determined by the following method.

<Content (wt %) of Fine Particles>

About 5 g of a fine-particle-dispersed polyol intermediate or a fine-particle-dispersed polyol is weighed precisely in a 50-ml centrifuge tube, and this weight is assumed to be a fine-particle-dispersed polyol weight (W1). This is diluted with 50 g of methanol added thereto. Using a refrigerated centrifuge [model: H-9R, manufactured by Kokusan Co., Ltd.], centrifugation is performed at 20° C., 18,000 rpm for 60 minutes. Supernatant fluid is removed with a glass pipette. Residual sediment is diluted with 50 g of methanol and subjected to centrifugation and removal of supernatant fluid as described above, and these operations are repeated three more times. The residual sediment in the centrifuge tube is dried under a reduced pressure of 2,666 to 3,999 Pa (20 to 30 torr), at 60° C., for 60 minutes, the weight of the sediment thus dried is measured, and this weight is assumed to be (W2). The value determined by calculation of the following expression is assumed to be the content (wt %) of fine particles:

$$\text{Content of fine particles (wt \%)} = (W2) \times 100 / (W1)$$

In a volume-based particle size distribution of the polymer fine particles (P) in the fine-particle-distributed polyol (I) obtained by the fine-particle-distributed polyol producing method of the present invention, the particle size distribution being derived from values in 85 divisions of the range of 0.020 µm to 2000 µm determined by the laser diffraction/scattering particle size distribution analyzer (LA-750, manufactured by HORIBA Ltd.; this applies hereinafter), the content of particles having diameters of not less than 10 µm in the polymer fine particles is preferably not more than 1 percent by volume (vol %), more preferably not more than 0.8 vol %, and particularly preferably 0 vol %, from the viewpoint of the physical properties (tear strength, etc.) of the polyurethane resin obtained using the same.

It should be noted that the polymer fine particles preferably have particle diameters substantially in a range of 0.020 to 2000 µm, from the viewpoint of the physical properties of the polyurethane resin. Herein "substantially" implies that not less than 99 vol %, preferably 100 vol %, of the particles have particle diameters in this range.

Further, the polymer fine particles in the fine-particle-dispersed polyol (I) preferably have a volume-average particle diameter in a range of 0.2 to 1.5 µm, more preferably in a range of 0.3 to 1.3 µm, and particularly preferably in a range of 0.4 to 1.0 µm, the volume-average particle diameters being determined by the laser diffraction/scattering particle size distribution analyzer. When the volume-average particle diameter is in the foregoing range, the polyurethane resin obtained using the polyol in which these particles are dispersed has excellent physical properties.

The fine-particle-dispersed polyol (I) obtained by the producing method of the present invention is used as, at least a part of, the polyol component used when a polyurethane resin is produced. In other words, the polyol (I) is used as, at least a part of, the polyol component, and is caused to react with a polyisocyanate component by a usual method in the presence of one or more types of usually used additives such as a catalyst, a blowing agent, and a foam stabilizer as required, so that a polyurethane resin is obtained. In the polyol component, the aforementioned polyol (a), in addition to (I), may be contained as required.

The amount (wt %) of (I) used in the polyol component is preferably 10 to 100 wt %, more preferably 15 to 90 wt %, particularly preferably 20 to 80 wt %, and most preferably 25 to 70 wt %, from the viewpoint of the mechanical properties of the polyurethane resin obtained and the viscosity of the polyol component.

As the polyisocyanate component, known organic polyisocyanate conventionally used in the production of polyurethane resins can be used Such an organic polyisocyanate is a compound having at least two isocyanate groups, and examples of the same include aromatic polyisocyanates (h1), aliphatic polyisocyanates (h2), alicyclic polyisocyanates (h3), araliphatic polyisocyanates (h4), modification products (h5) of these polyisocyanates (modification products having an urethane group, a carbodiimido group, an allophanate group, a urea group, a biuret group, an isocyanurate group, or an oxazolidon group, etc.), and mixtures of two or more of these.

Examples of (h1) include aromatic diisocyanates having 6 to 16 carbon atoms (excluding those contained in NCO groups; this applies to the polyisocyanates mentioned below), aromatic triisocyanates having 6 to 20 carbon atoms, and crude products of these isocyanates. More specifically, examples of the same include 1,3- and 1,4-phenylene diisocyanates, 2,4- and/or 2,6-tolylene diisocyanates (TDI), crude TDI, 2,4'- and/or 4,4'-diphenyl methane diisocyanate (MDI), crude MDI [products of crude diaminodiphenyl methane with phosgene where the crude diaminodiphenyl methane is a condensation product of formaldehyde with aromatic amine (aniline), or a mixture of diaminodiphenyl methane as a main product and a small amount (e.g., 5 to 20%) of a polyamine having three or more functional groups as a side product, for example, polyallyl polyisocyanate (PAPI)], naphthylene-1,5-diisocyanate, triphenyl methane-4,4',4"-triisocyanate, etc.

Examples of (h2) include aliphatic diisocyanates having 2 to 18 carbon atoms. More specifically, the examples include 1,6-hexamethylene diisocyanate, 2,2,4-trimethylhexamethylene diisocyanate, lysine diisocyanate, etc.

Examples of (h3) include alicyclic diisocyanates having 4 to 16 carbon atoms. More specifically, the examples include isophorone diisocyanate, 4,4'-dicyclohexyl methane diisocyanate, 1,4-cyclohexane diisocyanate, norbornane diisocyanate, etc.

Examples of (h4) include araliphatic diisocyanates having 8 to 15 carbon atoms. More specifically, the examples include xylylene diisocyanate, α,α,α',α'-tetramethyl xylylene diisocyanate, etc.

Examples of (h5) include urethane-modified MDI, carbodiimide-modified MDI, sucrose-modified TDI, castor oil-modified MDI, etc.

Among these, preferred are 2,4-TDI, 2,6-TDI, mixtures of these isomers, and crude TDI; 4,4'-MDI, 2,4'-MDI, mixtures of these isomers, and crude MDI; and modified polyisocyanates having an urethane group, a carbodiimido group, an allophanate group, an urea group, a biuret group, or an isocyanurate group derived from these polyisocyanates.

An isocyanate index [(equivalent ratio of NCO groups/active hydrogen atom-containing groups)×100] upon the production of a polyurethane resin is usually 80 to 140, preferably 85 to 120, and particularly preferably 95 to 115. Furthermore, the isocyanate index may be considerably higher than the above range (e.g., 300 to 1000) so that a polyisocyanurate group is introduced into the polyurethane resin.

In the production of a polyurethane resin, a catalyst normally used in a polyurethane-forming reaction [e.g., amine-based catalysts (tertiary amines such as triethylenediamine and N-ethylmorpholine); tin-based catalysts (stannous octoate, dibutyl tin dilaurate, etc.); and other metal catalysts (lead octoate, etc.)] may be used to accelerate the reaction. The amount of the catalyst is usually 0.001 to 5% on the basis of the weight of the reaction mixture.

In the present invention, the production of the polyurethane resin may be performed with use of a blowing agent (water, HFC (hydrofluorocarbon), HCFC (hydrochlorofluorocarbon), methylene chloride, etc.), so that a polyurethane foam is obtained. The amount of the blowing agent used may be varied with a desired density of the polyurethane foam.

In the production of the polyurethane resin of the present invention, a foam stabilizer may be used as required. Examples of the foam stabilizer include silicone surfactants (e.g., polysiloxane-polyoxyalkylene copolymer).

In the present invention, an anti-aging agent and an antioxidant may be used as required. As the anti-aging agent and the antioxidant, those that are known can be used (those disclosed by JP 2006-188685 A, etc.), which include lactone, hindered phenol, phosphor-containing compounds, hindered amine, hydroxylamine, and sulfur-containing compounds. With a view to preventing the discoloration of the polyurethane resin, lactone and hindered phenol preferably are used in combination.

Examples of other additives that can be used in the producing method of the present invention include known additives (those disclosed by JP 2005-162791 A, etc.) such as a flame retarder, a reaction retarder, a coloring agent, an internal mold release agent, an anti-aging agent, an antioxidant, a plasticizer, an antibacterial agent, a carbon black, and other known additives such as a filler.

Production of a polyurethane resin can be carried out by an ordinary method, for example, a one shot method, a semi-prepolymer method, a prepolymer method, or another known method.

In the production of polyurethane, a usually used production device can be employed. When no solvent is used, for example, a device such as a kneader or an extruder can be employed. Various types of non-foamed or foamed polyurethane resins can be produced within a closed or open mold. In the production of polyurethane, usually the materials are mixed and caused to react with use of a mechanical device at a low pressure or a high pressure. Furthermore, in the production of a polyurethane resin, gas such as the air dissolved in the materials or the air intermixed at the time of mixing can be removed by a vacuum method before or after the raw materials are mixed (particularly before the raw materials are mixed).

The fine-particle-dispersed polyol (I) obtained by the producing method of the present invention is particularly useful for producing a polyurethane foam such as a flexible molded foam or a slabstock foam. Furthermore, the polyol also can be used suitably for the molding by the RIM (reaction injection molding) method.

EXAMPLES

The present invention is described in more detail with reference to the following examples. However, the present invention is not limited to these examples in any way. In the following, the values of parts, percentages, and ratios indicate those of parts by weight, percentages by weight, and ratios by weight, respectively, unless otherwise provided.

The compositions, symbols, etc. of the materials used in the examples and comparative examples are as follows:
(1) Polyol (a1):
   polyol (a1-1): polyol obtained by adding PO-EO-PO in this order to glycerol, having a hydroxyl value of 56, an internal EO unit content of 5%, and an terminal PO unit content of 5%; and
   polyol (a1-2): polyol obtained by adding PO-EO in this order to pentaerythritol, having a hydroxyl value of 32, and an terminal EO unit content of 14%.
(2) Radical Polymerization Initiator (c):
   c1-1: 2,2'-azobis(2,4-dimethylvaleronitrile) [trade name: "V-65" produced Wako Pure Chemical Industries, Ltd.];
   c1-2: 2,2'-azobis(2-methylbutyronitrile) [trade name: "V-59" produced Wako Pure Chemical Industries, Ltd.];
   c1-3: 1,1'-azobis(cyclohexane-1-carbonitrile) [trade name: "V-40" produced Wako Pure Chemical Industries, Ltd.]; and
   c2-1: 1,1-di(t-hexylperoxy)cyclohexane [trade name: "Perhexa HC" produced by Nippon Oil and Fats (currently NOF Corporation)].
(3) Dispersant (d):
   d-1: reactive dispersant obtained by coupling 0.14 mole of the polyol (a1-2) and 0.07 mole of 2-hydroxyethyl methacrylate with use of 0.16 mole of TDI, the reactive dispersant having a hydroxyl value of 20, a ratio of the number of unsaturated groups/the number of nitrogen-containing groups of 0.22 [described in JP 2002-308920 A];
   d-2: oligomer-type non-reactive dispersant of acrylonitrile (ACN)-styrene (St) copolymer having a molecular weight of 600,000 in which a ratio by weight of ACN:St is 70:30. (When used, this oligomer-type dispersant was in a state of being mixed in the polyol (a1-2) so that a content of the dispersant was 10 wt %. This mixture had a hydroxyl value of 29.0)
(4) Active-Hydrogen-Containing Compound (D)
   D-1: active-hydrogen-containing compound obtained by adding PO to bisphenol A (hydroxyl equivalent: 114, SP value: 13.6), the compound having a number-average molecular weight of 518;
   D-2: active-hydrogen-containing compound obtained by adding PO to monostyrenated phenol (hydroxyl equivalent: 198, SP value: 12.1), the compound having a number-average molecular weight of 778;
   D-3: active-hydrogen-containing compound obtained by adding PO and EO by random addition to distyrenated phenol (hydroxyl equivalent: 302, SP value: 11.6), the compound having a number average molecular weight of 1554; and
   D-4: active-hydrogen-containing compound obtained by adding 2 moles of PO and 2 moles of EO by random addition to 1,4-dihydroxynaphthalene (hydroxyl equivalent: 80, SP value: 13.8), the compound having a number-average molecular weight of 364.
(5) Polyisocyanate
   TDI: "CORONATE T-80" [produced by Nippon Polyurethane Industry Co., Ltd.]
(6) Catalyst
   Catalyst A: "Neostann U-28" (stannous octoate) [produced by Nitto Kasei Co., Ltd.]; and
   Catalyst B: "DABCO" (triethylenediamine) [produced by Nippon Nyukazai Co., Ltd.]
(6) Foam Stabilizer
   "SRX-280A (trade name)" (polyether siloxane polymer) [produced by Dow Corning Toray Silicone Co., Ltd.]

Methods of measurement and evaluation for Examples are as follows.

<Volume-Average Particle Diameter>

An obtained fine-particle-dispersed polyol intermediate or an obtained fine-particle-dispersed polyol was diluted with a polyol used in the production of the fine-particle-dispersed polyol so that a transmittance of laser light was 70 to 90%, and a volume-average particle diameter (μm) was determined by the particle size distribution analyzer shown below.

Device: LA-750, manufactured by HORIBA Ltd.
Measurement theory: Mie diffusion theory
Measurement range: 0.04 μm to 262 μm
Amount of injected solution: He—Ne laser
Measurement time: 20 seconds <Volume-Average Particle Diameter>

The volume-average particle diameter was calculated using the following equation.

Volume-average particle diameter $(\mu m) = \Sigma[q(J) \times X(J)]/\Sigma[q(J)]$ J: particle diameter range division number (1 to 85)
q(J): mode distribution value (%)
X(J): particle diameter (μm) of particles in a particle diameter range division No. J <Content (wt %) of Fine Particles>

About 5 g of a fine-particle-dispersed polyol intermediate or a fine-particle-dispersed polyol was weighed precisely in a 50-ml centrifuge tube, and this weight was assumed to be a fine-particle-dispersed polyol weight (W1). This was diluted with 50 g of methanol added thereto. Using a refrigerated centrifuge [model: H-9R, manufactured by Kokusan Co., Ltd.], centrifugation was performed at 20° C., 18,000 rpm for 60 minutes. Supernatant fluid was removed with a glass pipette. Residual sediment was diluted with 50 g of methanol added thereto, and subjected to centrifugation and removal of supernatant fluid as described above. These operations were repeated three more times. The residual sediment in the centrifuge tube was dried under a reduced pressure of 2,666 to 3,999 Pa (20 to 30 torr), at 60° C., for 60 minutes, the weight of the sediment thus dried was measured, and this weight was assumed to be (W2). The value determined by calculation of the following expression is assumed to be the content (wt %) of fine particles:

Content of fine particles (wt %) = $(W2) \times 100/(W1)$

<Content (vol %) of Fine Particles>

The content (vol %) of fine particles were calculated by the following equation, using (W1) and (W2) derived in the above-described determination of the content (wt %) of fine particles.

$$\text{Content of fine particles (vol \%)} = \frac{(W2)/(\text{specific gravity of particles})}{(W1)/(\text{specific gravity of fine-particle-dispersed polyol(I)})} \times 100$$

<Viscosity>

The viscosity was measured using a BL-type viscometer (Tokyo Keiki Kogyo Co., Ltd.) under conditions of No. 3 rotor, 12 rpm, and 25° C.

<Content of Coarse Particles>

About 300 g of a fine-particle-dispersed polyol was weighed precisely in a 1-liter beaker. This weight was assumed to be a fine-particle-dispersed polyol weight (W3). To this polyol, 300 g of methanol was added, the methanol having been prepared by removing foreign matters preliminarily by filtration using an industrial woven wire mesh having a sieve opening of 0.10 mm (JIS G3556, this applies hereinafter), so that a homogeneous solution was obtained. This homogeneous solution was filtered using an industrial woven wire mesh having a sieve opening of 0.10 mm, and foreign matters remaining on the mesh were washed with 300 g of methanol that had been prepared by removing foreign matters preliminarily. The foreign matters thus washed were dried in an air circulating dryer at 70° C. for 30 minutes, and the weight of the foreign matters thus dried was measured. This weight was assumed to be a weight (W4) of foreign matters (this weight was measured with an accuracy to the fourth decimal place. Unit: g). The value calculated according to the following equation is assumed to be a content of polymer particles having particle diameters of not less than 0.10 mm in the fine-particle-dispersed polyol (hereinafter this content is referred to simply as "coarse particle content").

$$\text{Coarse particle content (wt ppm)} = (W4) \times 100/(W3)$$

<Conversion Ratio>

A residual monomer content of each type of monomers with respect to an amount of monomers used was determined, and the conversion ratio was calculated from a weight average of these residual monomer contents. The residual monomer content was calculated from an area ratio with respect to an internal standard substance determined by gas chromatography. A specific analysis method is shown below, in which styrene is used as an example.

$$\text{Conversion ratio [wt \%]} = 100 - 100 \times \frac{(\text{residual styrene content [\%]})}{(\text{amount of styrene used in row materials [\%]})}$$

Residual styrene content [%]=L/M×(factor with respect to internal standard substance)
L=(peak area of residual styrene)/(weight [g] of fine-particle-dispersed polyol)
M=(peak area of internal standard substance)/(weight [g] of internal standard substance)

The factor with respect to internal standard substance is a value obtained by dividing a peak area of each monomer per a certain mass by a peak area of the internal standard substance per the same mass.

Gas chromatograph: GC-14B (manufactured by Shimadzu Corporation)
Column: inner diameter: 4 mmϕ, length: 1.6 mm, made of glass
Column filler: polyethylene glycol 20 M (manufactured by Shinwa Chemical Industries, Ltd.)
Internal standard substance: bromobenzene (manufactured by Nacalai Tesque, Inc.)
Diluting solvent: dipropylene glycol monomethyl ether, extra pure reagent [manufactured by Wako Pure Chemical. Industries, Ltd.] (used in a state of 50% solution)
Injection temperature: 200° C.
Column initial temperature: 110° C.
Temperature rising rate: 5° C./min
Column final temperature: 200° C.
Sample injection amount: 1 μl Production Example 1

Production of Fine-Particle-Dispersed Polyol Intermediate (H-1)

Into a four-neck flask provided with a thermoregulator, a vacuum rotor, a dropping pump, a decompression device, a Dimroth condenser, and nitrogen inlet and outlet, the polyol (a1-1), the active-hydrogen-containing compound (D-1), the dispersant (d-1), and xylene were charged. The respective numbers of parts of these materials thus charged are shown in the rows of "Initial amount" in Table 1. After the atmosphere was replaced with nitrogen, the temperature of the mixture was increased to 130° C. under agitation in the nitrogen atmosphere (until the polymerization ended). Subsequently, a monomer-containing mixture solution (Z1) obtained by preliminarily mixing the polyol (a1-1), the dispersant (d-1), ACN (acrylonitrile), styrene, divinylbenzene, the radical polymerization initiator (c1-1), and xylene, amounts (parts) of which are shown in the rows of "Monomer solution" in Table 1, was dropped continuously at a rate of 25 parts per minute by using the dropping pump, and after the dropping was completed, the polymerization further was caused to proceed at 130° C. for 30 minutes. Then, the temperature was decreased to 25° C. by a cooling operation, and a fine-particle-dispersed polyol intermediate (H-1) was obtained. The volume-average particle diameter and the content (wt %) of the fine particles in (H-1) were determined, which are shown in Table 1.

Production Examples 2 to 5

Production of Fine-Particle-Dispersed Polyol Intermediates (H-2) to (H-5)

Fine-particle-dispersed polyol intermediates (H-2) to (H-5) were obtained in the same manner as that of Production Example 1 except that the initially charged materials and the monomer solutions used therein were different; the numbers of parts of the materials used are shown in Table 1. As to each of (H-2) to (H-5), the volume-average particle diameter and the content (wt %) of the fine particles were determined, which are shown in Table 1.

Production Example 6

Production of Fine-Particle-Dispersed Polyol Intermediate (H-6)

Into a 500 ml glass beaker, 87.5 g of colloidal silica (produced by Nissan Chemical Industries Co., Ltd., trade name: MA-ST-M, methanol dispersion containing 40% of solid contents) and 65 g of (a1-1) were charged, and were mixed at 10,000 rpm by a TK autohomomixer (manufactured by TOKUSHU KIKA INDUSTRIES, Ltd. (currently PREMIX Corporation), model: desktop-type f MODEL), whereby a homogeneous solution was obtained. Methanol was removed from this mixture solution by vacuum stripping at 2,666 to 3,999 Pa (20 to 30 torr) at 130 to 140° C. for two hours using a rotary evaporator (manufactured by Tokyo Rikakikai Co., Ltd, model: N-1000S-W). As a result, a fine-particle-dispersed polyol intermediate (H-6) was obtained.

The volume-average particle diameter of fine particles in (H-6) was 0.01 μm, and the content (wt %) of the fine particles was 37 wt %.

Production Examples 7 to 11

Production of Fine-Particle-Dispersed Polyol Intermediates (H-7) to (H-11)

Fine-particle-dispersed polyol intermediates (H-7) to (H-11) were obtained in the same manner as that of Production Example 1 except that the initially charged materials and the monomer solutions shown in the columns of "H-7" to "H-11" in Table 1 were used, respectively. As to each of (H-7) to (H-11), the volume-average particle diameter and the content (wt %) of the fine particles were determined, which are shown in Table 1.

[Second step] A material mixture solution (G1-2) obtained by mixing (B1-1) overflowed from the first device at the solution sending rate for the first device shown in Table 2, (a1-1), ACN, styrene, the radical polymerization initiator (c1-1), and xylene was in-line-blended with a static mixer. The numbers of parts of these materials mixed are shown in Table 2. Thereafter, the mixture solution was sent continuously to the polymerization vessel of the second device at a solution sending rate for the second device shown in Table 2. A reaction solution overflowed from the polymerization vessel was stocked in a SUS-made receiver, whereby a fine-particle-dispersed polyol intermediate (B1-2) was obtained. Non-reacted monomers and xylene were removed from (B1-2) by vacuum strip-

TABLE 1

| | | Production Example | | | | | | | | | |
|---|---|---|---|---|---|---|---|---|---|---|---|
| | | 1 | 2 | 3 | 4 | 5 | 7 | 8 | 9 | 10 | 11 |
| Fine-particle-dispersed polyol Intermediate | | H-1 | H-2 | H-3 | H-4 | H-5 | H-7 | H-8 | H-9 | H-10 | H-11 |
| Initially charged material (part) | a1-1 | 254.9 | 191.3 | 285.4 | 303.8 | 281.0 | 144.4 | 230.0 | 191.3 | 285.4 | 303.8 |
| | D-1 | 40.3 | 51.8 | 51.8 | 51.8 | 51.8 | 69 | 73.8 | 0 | 0 | 0 |
| | D-2 | 0 | 0 | 0 | 0 | 0 | 0 | 0 | 51.8 | 0 | 0 |
| | D-3 | 0 | 0 | 0 | 0 | 0 | 0 | 0 | 0 | 51.8 | 0 |
| | D-4 | 0 | 0 | 0 | 0 | 0 | 0 | 0 | 0 | 0 | 51.8 |
| | d-1 | 57.4 | 112.5 | 18.4 | 0 | 23 | 42 | 0 | 112.5 | 18.4 | 0 |
| | d-2 | 0 | 0 | 0 | 73.8 | 0 | 0 | 51.8 | 0 | 0 | 73.8 |
| | Xylene | 123.5 | 120.5 | 120.5 | 120.5 | 120.5 | 44.6 | 120.5 | 120.5 | 120.6 | 120.5 |
| Monomer solution (part) | a1-1 | 142.2 | 33.1 | 33.1 | 55.6 | 56.0 | 62.2 | 33.1 | 33.1 | 33.1 | 55.6 |
| | d-1 | 17.5 | 22.5 | 22.5 | 0 | 0 | 30 | 22.5 | 22.5 | 22.5 | 0 |
| | d-2 | 0 | 0 | 0 | 22.5 | 0 | 0 | 0 | 0 | 0 | 22.5 |
| | ACN | 105 | 135 | 135 | 450 | 315 | 90 | 135 | 135 | 135 | 450 |
| | Styrene | 245 | 315 | 315 | 0 | 135 | 510 | 315 | 315 | 315 | 0 |
| | Divinylbenzene | 0.35 | 0.45 | 0.45 | 0.45 | 0 | 0.6 | 0.45 | 0.45 | 0.45 | 0.45 |
| | c1-1 | 3.5 | 4.5 | 4.5 | 4.5 | 4.5 | 1.8 | 4.5 | 4.5 | 4.5 | 4.5 |
| | Xylene | 10.5 | 13.5 | 13.5 | 13.5 | 14 | 5.4 | 13.5 | 13.5 | 13.5 | 13.5 |
| Volume-average particle diameter (μm) | | 0.20 | 0.10 | 0.50 | 0.05 | 0.70 | 1.00 | 1.20 | 0.10 | 0.50 | 0.05 |
| Content of fine particles (wt %) | | 35 | 45 | 45 | 45 | 45 | 60 | 45 | 45 | 45 | 45 |

Example 1

Production of Fine-Particle-Dispersed Polyol

[First step] Two continuous polymerization devices (2-liter SUS-made pressure-resistant reaction containers, to each of which a solution sending line and an overflow line were connected) were prepared, and the foregoing two devices (hereinafter referred to as first and second devices) were arranged in series in a manner such that the overflow line of a polymerization vessel of the first device was connected with an inlet of a polymerization vessel of the second device. 2000 parts of the polyol (a1-1) was charged in each of the polymerization vessels of the first and second devices in advance, and was heated to 130° C. A material mixture solution (G1-1) obtained by mixing the fine-particle-dispersed polyol (H-1), (a1-1), the active-hydrogen-containing compound (D-1), (d-1), ACN (acrylonitrile), styrene, divinylbenzene, the radical polymerization initiator (c1-1), and xylene was in-line-blended with a static mixer. The numbers of mixed parts of these materials are shown in Table 2. Thereafter, the mixture solution was sent continuously to the polymerization vessel of the first device at a solution sending rate for the first device shown in Table 2. Thus, a polymer polyol intermediate (B1-1) overflowed from the polymerization vessel was obtained. The polymer polyol intermediate (B1-1) overflowed from the polymerization vessel of the first device was sent continuously to the polymerization vessel of the second device at the same solution sending rate as that for the first device shown in Table 2.

ping at 2,666 to 3,999 Pa (20 to 30 torr) at 130 to 140° C. for two hours. As a result, a fine-particle-dispersed polyol (I-1) was obtained. The fine-particle-dispersed polyol (I-1) was measured and evaluated by the above-described measurement and evaluation methods. The results are shown in Table 4 below.

Examples 2 to 7 and 15 to 17

Production of Fine-Particle-Dispersed Polyols (I-2) to (I-7) and (I-15) to (I-17)

Fine-particle-dispersed polyols (I-2) to (I-7) and (I-15) to (I-17) were obtained in the same manner as that of Example 1 except that the material mixture solutions used in the first and second steps were different from those of Example 1; as to each of the material mixture solutions, the numbers of parts of the materials mixed are shown in Table 2 or 3. Each of (I-2) to (I-7) and (I-15) to (I-17) was subjected to the same measurement and evaluation as those for Example 1. The results are shown in Tables 4 and 5.

Example 8

Production of Line-Particle-Dispersed Polyol (I-8)

[First Step] Into a 1.5-liter SUS-made pressure-resistant reaction container, a material mixture solution obtained by mixing (H-7), (a1-1), the active-hydrogen-containing compound (D-1), (d-1), ACN, styrene, divinylbenzene, and xylene was charged at 25° C., and the temperature of the mixture was adjusted to 100° C. under agitation. The numbers of parts of the foregoing materials mixed are shown in Table 2. A solution obtained by dissolving the radical polymerization initiators (c1-1) to (c2-1) in 10 parts of xylene was charged into the reaction container over 5 seconds and mixed with the foregoing mixture solution, so that polymerization was initiated. The numbers of parts of (c1-1) to (c2-1) thus dissolved are shown in Table 2. The polymerization reaction was initiated quickly within 1 minute after the radical polymerization initiator solution was added, and the temperature reached the highest level of about 120° C., about 6 minutes after. After the highest temperature was reached, aging was carried out for 10 minutes at a temperature of 110 to 130° C., and the temperature was decreased to 25° C. by a cooling operation. As a result, a fine-particle-dispersed polyol intermediate (B8-1) was obtained.

[Second Step] Subsequently, a material mixture solution obtained by mixing (a1-1), ACN, styrene, and xylene was charged into the reaction container at 25° C., and the temperature of the mixture was adjusted to 95° C. under agitation. The numbers of parts of these materials mixed are shown in Table 2. A solution obtained by dissolving (c1-1) to (c2-1) in 10 parts of xylene was charged into the reaction container over 5 seconds and mixed with the foregoing mixture, so that polymerization was initiated. The numbers of parts of (c1-1) to (c2-1) thus dissolved are shown in Table 2. The polymerization reaction was initiated quickly within 1 minute after the radical polymerization initiator solution was added, and the temperature reached the highest level of about 120° C., about 6 minutes after. After the highest temperature was reached, aging was carried out for about 10 minutes at a temperature of 110 to 130° C., and the temperature was decreased to 25° C. by a cooling operation. As a result, a fine-particle-dispersed polyol intermediate (B8-2) was obtained.

Non-reacted monomers and xylene were removed from (B8-2) by vacuum stripping at 2,666 to 3,999 Pa (20 to 30 torr) at 130 to 140° C. for two hours. As a result, a fine-particle-dispersed polyol (I-8) was obtained. (I-8) was subjected to the same measurement and evaluation as those for Example 1. The results are shown in Table 4.

Example 9

Production of Fine-Particle-Dispersed Polyol (I-9)

A continuous polymerization device (a 2-liter SUS-made pressure-resistant reaction container to which a solution sending line and an overflow line were connected) was prepared, and in a polymerization vessel thereof, 2,000 parts of the polyol (a1-1) was filled preliminarily, and was heated to 130° C. Subsequently, a raw material mixture solution (G9-1) obtained by mixing the fine-particle-dispersed polyol (H-3), (a1-1), the active-hydrogen-containing compound (D-1), ACN, styrene, divinylbenzene, and the radical polymerization initiator (c1-1) was in-line-blended with a static mixer, and thereafter, it continuously was sent to a polymerization vessel at the solution sending rate for the first device shown in Table 2. The numbers of parts of materials in (G9-1) are shown in Table 2. A reaction solution overflowed from the polymerization vessel was stocked in a SUS-made receiver, whereby a fine-particle-dispersed polyol intermediate (B9-2) was obtained. From (B9-2), non-reacted monomers and xylene were removed by vacuum stripping at 2,666 to 3,999 Pa (20 to 30 torr) at 130 to 140° C. for two hours. As a result, a fine-particle-dispersed polyol (I-9) was obtained. The polyol (I-9) was evaluated by the above-described measurement and evaluation methods. The results are shown in Table 4.

Examples 10 to 14

Production of Fine-Particle-Dispersed Polyols (I-10) to (I-14)

Fine-particle-dispersed polyols (I-10) to (I-14) were obtained in the same manner as that of Example 9 except that material mixture solutions used therein were different; as to each of the material mixture solutions, the numbers of parts of the materials mixed are shown in Table 2 or 3. Each of (I-10) to (I-14) was subjected to the same measurement and evaluation as those for Example 1. The results are shown in Tables 4 and 5.

Comparative Examples 1 to 4

Production of Comparative Fine-Particle-Dispersed Polyols (R-1) to (R-4)

Fine-particle-dispersed polyols (R-1) to (R-4) were obtained in the same manner as that of Example 1 except that material mixture solutions used in First and Second Steps were different; as to each of the material mixture solutions, the numbers of parts of the materials mixed are shown in Table 3. Each of (R-1) to (R-4) was subjected to the same measurement and evaluation as those for Example 1. The results are shown in Table 5.

Comparative Examples 5 to 7

Production of Comparative Fine-Particle-Dispersed Polyols (R-5) to (R-7)

Fine-particle-dispersed polyols (R-5) to (R-7) were obtained in the same manner as that of Example 9 except that material mixture solutions used therein were different; as to each of the material mixture solutions, the numbers of parts of the materials mixed are shown in Table 3. Each of (R-5) to (R-7) was subjected to the same measurement and evaluation as those for Example 1. The results are shown in Table 5.

Examples 18 to 36 and Comparative Examples 8 to 14

Production of Polyurethane Foams

Polyurethane foams were produced using the fine-particle-dispersed polyols (I-1) to (I-17) and comparative fine-particle-dispersed polyols (R-1) to (R-7) obtained in Examples 1 to 17 and Comparative Examples 1 to 7, as well as other materials shown in Tables 6 and 7, under foaming conditions shown below. The formulations of these materials used are shown in Tables 6 and 7. The results of measurement of foam properties of these polyurethane foams are shown in Tables 6 and 7. The foaming process is as follows:

[1] Temperatures of a fine-particle-dispersed polyol, the polyol (a1-1), and polyisocyanate were adjusted to 25±2° C.;

[2] The fine-particle-dispersed polyol, the polyol (a1-1), a foam stabilizer, water, and a catalyst were charged in this order into a paper cup having a capacity of 1 liter, and mixed at room temperature (25° C.±2° C.) under agitation. Polyisocyanate was added immediately to the mixture, and the mixture was agitated with an agitator [Homodisper; manufactured by TOKUSHU KIKA INDUSTRIES, Ltd., agitation condition: 2000 rpm×8 seconds], so as to be foamed.

[3] After the agitation was stopped, the mixed contents in the paper cup were charged into a 25 cm×25 cm×10 cm wooden box (at 25±2° C.), whereby a polyurethane foam was obtained.

TABLE 2

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| 1st Step (part) | Fine-particle-dispersed polyol Intermediate | H-1 127.8 | H-2 319.6 | H-3 49.7 | H-4 348.0 | H-5 10.9 | H-6 298.2 | H-7 1.3 | H-2 596.5 | H-3 576.6 | H-4 745.6 | H-5 485.9 | H-6 775.4 |
| | a1-1 | 206.8 | 53.4 | 43.8 | 153.8 | 62.4 | 131.2 | 107.8 | 234.7 | 175.6 | 94.5 | 203.5 | 79.3 |
| | D-1 | 6.77 | 6.77 | 5.44 | 6.77 | 6.26 | 4.7 | 0 | 4.7 | 13.2 | 7.8 | 16.3 | 6.9 |
| | D-2 | 0 | 0 | 0 | 0 | 0 | 0 | 0 | 0 | 0 | 0 | 0 | 0 |
| | D-3 | 0 | 0 | 0 | 0 | 0 | 0 | 0 | 0 | 0 | 0 | 0 | 0 |
| | D-4 | 0 | 0 | 0 | 0 | 0 | 0 | 0 | 0 | 0 | 0 | 0 | 0 |
| | d-1 | 29.0 | 14.7 | 31.1 | 24.2 | 0 | 30.2 | 39 | 3.4 | 0.0 | 16.8 | 0.0 | 19.7 |
| | d-2 | 0 | 0 | 0 | 0 | 37.65 | 0 | 0 | 0 | 0 | 0 | 0 | 0 |
| | ACN | 29.0 | 29.0 | 23.3 | 29.03 | 89.47 | 46.97 | 29.03 | 10 | 56 | 34 | 70 | 69 |
| | Styrene | 67.7 | 67.7 | 54.4 | 67.7 | 0 | 20.1 | 67.7 | 57.0 | 131.5 | 78.3 | 163.5 | 29.5 |
| | Divinylbenzene | 1.21 | 1.01 | 1.28 | 0.87 | 1.33 | 0.94 | 2.68 | 0.27 | 0.56 | 0.34 | 0.70 | 0.00 |
| | c1-1 | 0 | 0 | 0 | 0 | 0 | 0 | 0 | 0.67 | 0 | 0 | 0 | 0 |
| | c1-2 | 0.97 | 0.97 | 0.78 | 0.97 | 0.89 | 0.67 | 0.97 | 0.20 | 1.88 | 1.12 | 2.34 | 0.98 |
| | c1-3 | 0 | 0 | 0 | 0 | 0 | 0 | 0 | 0.13 | 0 | 0 | 0 | 0 |
| | c2-1 | 0 | 0 | 0 | 0 | 0 | 0 | 0 | 0.07 | 0 | 0 | 0 | 0 |
| | Xylene | 39.9 | 16.2 | 49.1 | 13.7 | 54.3 | 26.2 | 0 | 51.0 | 0 | 0 | 2.5 | 0 |
| 2nd Step (part) | a1-1 | 118.1 | 187.6 | 325.5 | 98.1 | 314.9 | 137.1 | 280.3 | 187.4 | — | — | — | — |
| | d-1 | 0 | 0 | 0 | 0 | 0 | 0 | 0 | 0 | — | — | — | — |
| | d-2 | 0 | 0 | 0 | 0 | 0 | 0 | 0 | 0 | — | — | — | — |
| | ACN | 91.8 | 71.6 | 104.2 | 58.2 | 353.4 | 172.2 | 105.0 | 3.36 | — | — | — | — |
| | Styrene | 214.1 | 167.1 | 243.1 | 135.8 | 0 | 73.8 | 245.1 | 19.0 | — | — | — | — |
| | Divinylbenzene | 0 | 0 | 0 | 0 | 0 | 0 | 0 | 0.22 | — | — | — | — |
| | c1-1 | 0 | 0 | 0 | 0 | 0 | 0 | 0 | 0.07 | — | — | — | — |
| | c1-2 | 3.06 | 2.39 | 3.47 | 1.94 | 3.53 | 2.46 | 3.50 | 0.07 | — | — | — | — |
| | c1-3 | 0 | 0 | 0 | 0 | 0 | 0 | 0 | 0.04 | — | — | — | — |
| | c2-1 | 0 | 0 | 0 | 0 | 0 | 0 | 0 | 0.02 | — | — | — | — |
| | Xylene | 9.2 | 7.2 | 10.4 | 5.8 | 10.6 | 0 | 0 | 1.07 | — | — | — | — |
| Solution sending rate | First device (part/min) | 113.1 | 113.1 | 57.5 | 143.3 | 58.4 | 124.3 | 59.1 | — | 210.0 | 210.0 | 210.0 | 210.0 |
| | Second device (part/min) | 96.9 | 96.9 | 152.5 | 66.7 | 151.6 | 85.7 | 150.9 | — | — | — | — | — |

TABLE 3

| | | Example | | | | | Comparative Example | | | | | | |
|---|---|---|---|---|---|---|---|---|---|---|---|---|---|
| | | 13 | 14 | 15 | 16 | 17 | 1 | 2 | 3 | 4 | 5 | 6 | 7 |
| 1st Step (part) | Fine-particle-dispersed polyol Intermediate | H-7 242.5 | H-1 596.5 | H-9 319.6 | H-10 49.7 | H-11 348.0 | H-1 127.8 | H-1 63.9 | H-8 99.4 | — | H-3 318.1 | H-4 596.5 | H-5 485.9 |
| | a1-1 | 226.8 | 420.8 | 53.4 | 43.8 | 153.8 | 249.8 | 194.7 | 231.4 | 269.6 | 273.9 | 114.4 | 203.5 |
| | D-1 | 0.0 | 6.3 | 0 | 0 | 0 | 1.57 | 25.05 | 6.77 | 15.66 | 21.29 | 12.53 | 16.35 |
| | D-2 | 0 | 0 | 6.77 | 0 | 0 | 0 | 0 | 0 | 0 | 0 | 0 | 0 |
| | D-3 | 0 | 0 | 0 | 5.44 | 0 | 0 | 0 | 0 | 0 | 0 | 0 | 0 |
| | D-4 | 0 | 0 | 0 | 0 | 6.77 | 0 | 0 | 0 | 0 | 0 | 0 | 0 |
| | d-1 | 43.5 | 6.5 | 14.7 | 31.1 | 24.2 | 6.7 | 107.4 | 29.0 | 67.1 | 0.0 | 53.7 | 0.0 |
| | d-2 | 0 | 0 | 0 | 0 | 0 | 0 | 0 | 0 | 0 | 0 | 0 | 0 |
| | ACN | 109 | 13 | 29.0 | 23.3 | 29.03 | 6.71 | 107.37 | 29.03 | 67.11 | 91.26 | 53.68 | 70.06 |
| | Styrene | 253.7 | 76.1 | 67.7 | 54.4 | 67.7 | 15.7 | 250.5 | 67.7 | 156.6 | 212.9 | 125.3 | 163.5 |
| | Divinylbenzene | 2.17 | 0.27 | 1.01 | 1.28 | 0.87 | 1.21 | 1.28 | 1.21 | 1.34 | 0.91 | 0.54 | 0.70 |
| | c1-1 | 0 | 0 | 0.68 | 0.78 | 0.97 | 0 | 0 | 0 | 0 | 0 | 0 | 0 |
| | c1-2 | 3.62 | 0.89 | 0 | 0 | 0 | 0.22 | 3.58 | 0.97 | 2.24 | 3.04 | 1.79 | 2.34 |
| | c1-3 | 0 | 0 | 0 | 0 | 0 | 0 | 0 | 0 | 0 | 0 | 0 | 0 |
| | c2-1 | 0 | 0 | 0.29 | 0 | 0 | 0 | 0 | 0 | 0 | 0 | 0 | 0 |
| | Xylene | 0 | 52.3 | 16.2 | 49.1 | 13.7 | 37.6 | 98.4 | 43.7 | 59.5 | 34.7 | 0 | 2.5 |
| 2nd Step (part) | a1-1 | — | — | 187.6 | 325.5 | 98.1 | 102.6 | 634.7 | 118.1 | 73.9 | — | — | — |
| | d-1 | — | — | 0 | 0 | 0 | 0 | 0 | 0 | 0 | — | — | — |
| | d-2 | — | — | 0 | 0 | 0 | 0 | 0 | 0 | 0 | — | — | — |
| | ACN | — | — | 71.6 | 104.2 | 58.2 | 114.1 | 20.1 | 91.8 | 67.1 | — | — | — |
| | Styrene | — | — | 167.1 | 243.1 | 135.8 | 266.19 | 46.97 | 214.11 | 156.58 | — | — | — |
| | Divinylbenzene | — | — | 0 | 0 | 0 | 0 | 0 | 0 | 0 | — | — | — |
| | c1-1 | — | — | 1.67 | 3.47 | 1.94 | 0 | 0 | 0 | 0 | — | — | — |
| | c1-2 | — | — | 0 | 0 | 0 | 3.80 | 0.67 | 3.06 | 2.24 | — | — | — |

TABLE 3-continued

|  |  | Example |  |  |  |  | Comparative Example |  |  |  |  |  |  |
|---|---|---|---|---|---|---|---|---|---|---|---|---|---|
|  |  | 13 | 14 | 15 | 16 | 17 | 1 | 2 | 3 | 4 | 5 | 6 | 7 |
|  | c1-3 | — | — | 0 | 0 | 0 | 0 | 0 | 0 | 0 | — | — | — |
|  | c2-1 | — | — | 0.72 | 0 | 0 | 0 | 0 | 0 | 0 | — | — | — |
|  | Xylene | — | — | 7.2 | 10.4 | 5.8 | 11.4 | 2.0 | 9.2 | 6.7 | — | — | — |
| Solution sending rate | First device (part/min) | 210.0 | 210.0 | 113.1 | 57.5 | 143.3 | 99.4 | 115.0 | 113.1 | 141.9 | 210.0 | 210.0 | 210.0 |
|  | Second device (part/min) | — | — | 96.9 | 152.5 | 66.7 | 110.6 | 95.0 | 96.9 | 68.1 | — | — | — |

TABLE 4

|  |  | Example | | | | | |
|---|---|---|---|---|---|---|---|
|  |  | 1 | 2 | 3 | 4 | 5 | 6 |
| Fine-particle-dispersed polyol | | I-1 | I-2 | I-3 | I-4 | I-5 | I-6 |
| Fine-particle-dispersed polyol intermediate | | H-1 | H-1 | H-2 | H-3 | H-4 | H-5 |
|  | Comp. of P1 | ACN/St | ACN/St | ACN/St | ACN/St | ACN | ACN/St |
|  | (R1) (μm) | 0.2 | 0.2 | 0.1 | 0.5 | 0.05 | 0.7 |
| Weight of (b)/{total weight of (a), (P1), (b), (c), (d) and (f)} (wt %) | | 19 | 19 | 30 | 15 | 35 | 12 |
| n | | 3 | 3 | 3 | 3 | 3 | 3 |
| Volume-average particle diameter (R) of (I) | | 0.65 | 0.45 | 0.35 | 0.85 | 0.4 | 0.78 |
| Content of fine particles in (P1) (vol %) | | 5 | 12 | 2 | 17 | 0.5 | 34 |
| Content of fine particles in (I) (vol %) | | 49 | 49 | 49 | 49 | 49 | 49 |
| {(V)/(Q)} | | 10 | 4 | 20 | 3 | 100 | 1 |
| Formula | Formula (1) | Satisfied | Satisfied | Satisfied | Satisfied | Satisfied | Satisfied |
|  | Formula (1') | Satisfied | Satisfied | Satisfied | Satisfied | Satisfied | Satisfied |
|  | Formula (1") | Satisfied | Satisfied | Satisfied | Satisfied | Not satisfied | Satisfied |
|  | Formula (2) | Satisfied | Satisfied | Satisfied | Satisfied | Satisfied | Satisfied |
|  | Formula (2') | Satisfied | Satisfied | Satisfied | Satisfied | Satisfied | Satisfied |
|  | Formula (2") | Satisfied | Satisfied | Satisfied | Satisfied | Satisfied | Not satisfied |
| St (wt %, to total weight of ethylenically-unsaturated monomer) | | 69.8 | 69.8 | 69.8 | 69.8 | 0.0 | 29.9 |
| ACN (wt %, to total weight of ethylenically-unsaturated monomer) | | 29.9 | 29.9 | 29.9 | 29.9 | 99.7 | 69.9 |
| Conversion ratio (wt %) | 1st step | 83 | 88 | 80 | 84 | — | 83 |
|  | 2nd step | 92 | 96 | 92 | 92 | 93 | 92 |
| Content of fine particles (wt %, to fine-particle-dispersed polyol) | | 50.0 | 50.0 | 50.0 | 50.0 | 50.0 | 50.0 |
| Viscosity (mPa·s) | | 7,800 | 7,500 | 8,200 | 7,300 | 7,500 | 7,700 |
| Coarse particle content (wt ppm) | | 5 | 4 | 6 | 11 | 12 | 16 |
| Evaluation of polyurethane foam | | Ex. 18, 19, 20 | Ex. 21 | Ex. 22 | Ex. 23 | Ex. 24 | Ex. 25 |

|  |  | Example | | | | | |
|---|---|---|---|---|---|---|---|
|  |  | 7 | 8 | 9 | 10 | 11 | 12 |
| Fine-particle-dispersed polyol | | I-7 | I-8 | I-9 | I-10 | I-11 | I-12 |
| Fine-particle-dispersed polyol intermediate | | H-6 | H-7 | H-2 | H-3 | H-4 | H-5 |
|  | Comp. of P1 | Colloidal silica | ACN/St | ACN/St | ACN/St | ACN | ACN/St |
|  | (R1) (μm) | 0.01 | 1 | 0.1 | 0.5 | 0.05 | 0.7 |
| Weight of (b)/{total weight of (a), (P1), (b), (c), (d) and (f)} (wt %) | | 40 | 7 | 20 | 11 | 25 | 10 |
| n | | 3 | 3 | 2 | 2 | 2 | 2 |
| Volume-average particle diameter (R) of (I) | | 0.2 | 1.08 | 0.18 | 0.65 | 0.11 | 0.55 |
| Content of fine particles in (P1) (vol %) | | 0.05 | 31 | 28 | 37 | 23 | 38 |
| Content of fine particles in (I) (vol %) | | 49 | 39 | 49 | 49 | 49 | 49 |
| {(V)/(Q)} | | 1,000 | 1 | 2 | 1 | 2 | 1 |
| Formula | Formula (1) | Satisfied | Satisfied | Satisfied | Satisfied | Satisfied | Satisfied |
|  | Formula (1') | Not satisfied | Satisfied | Satisfied | Satisfied | Satisfied | Satisfied |
|  | Formula (1") | Not satisfied | Satisfied | Satisfied | Satisfied | Not satisfied | Satisfied |
|  | Formula (2) | Satisfied | Satisfied | Satisfied | Satisfied | Satisfied | Not satisfied |

TABLE 4-continued

|  |  |  |  |  |  |  |  |
|---|---|---|---|---|---|---|---|
|  | Formula (2') | Satisfied | Not satisfied | Satisfied | Satisfied | Satisfied | Not satisfied |
|  | Formula (2") | Satisfied | Not satisfied | Satisfied | Satisfied | Satisfied | Not satisfied |
| St (wt %, to total weight of ethylenically-unsaturated monomer) | | 69.6 | 84.9 | 69.9 | 69.9 | 69.9 | 30.0 |
| ACN (wt %, to total weight of ethylenically-unsaturated monomer) | | 29.8 | 15.0 | 29.9 | 30.0 | 29.9 | 70.0 |
| Conversion ratio (wt %) | 1st step | 83 | 72 | 83 | 92 | 92 | 91 |
|  | 2nd step | 91 | 92 | — | — | — | — |
| Content of fine particles (wt %, to fine-particle-dispersed polyol) | | 50.0 | 40.0 | 50.0 | 50.0 | 50.0 | 50.0 |
| Viscosity (mPa·s) | | 8,300 | 9,400 | 8,500 | 8,300 | 7,800 | 7,700 |
| Coarse particle content (wt ppm) | | 13 | 25 | 22 | 22 | 12 | 15 |
| Evaluation of polyurethane foam | | Ex. 26 | Ex. 27 | Ex. 28 | Ex. 29 | Ex. 30 | Ex. 31 |

TABLE 5

|  |  | Example | | | | |
|---|---|---|---|---|---|---|
|  |  | 13 | 14 | 15 | 16 | 17 |
| Fine-particle-dispersed polyol | | I-13 | I-14 | I-15 | I-16 | I-17 |
| Fine-particle-dispersed polyol intermediate | | H-6 | H-7 | H-9 | H-10 | H-11 |
|  | Comp. of P1 | Colloidal silica | ACN/St | ACN/St | ACN/St | ACN |
|  | (R1) (μm) | 0.01 | 1 | 0.1 | 0.5 | 0.05 |
| Weight of (b)/total weight of (a), (P1), (b), (c), (d) and (f) (wt %) | | 41 | 8 | 30 | 15 | 35 |
| n | | 2 | 2 | 3 | 3 | 3 |
| Volume-average particle diameter (R) of (I) | | 0.034 | 1.09 | 0.35 | 0.85 | 0.4 |
| Content of fine particles in (P1) (vol %) | | 9.3 | 31 | 2 | 17 | 0.5 |
| Content of fine particles in (I) (vol %) | | 49 | 39 | 49 | 49 | 49 |
| {(V)/(Q)} | | 5 | 1 | 20 | 3 | 100 |
| Formula | Formula (1) | Satisfied | Satisfied | Satisfied | Satisfied | Satisfied |
|  | Formula (1') | Not satisfied | Satisfied | Satisfied | Satisfied | Satisfied |
|  | Formula (1") | Not satisfied | Satisfied | Satisfied | Satisfied | Not satisfied |
|  | Formula (2) | Satisfied | Satisfied | Satisfied | Satisfied | Satisfied |
|  | Formula (2') | Satisfied | Not satisfied | Satisfied | Satisfied | Satisfied |
|  | Formula (2") | Satisfied | Not satisfied | Satisfied | Satisfied | Satisfied |
| St (wt %, to total weight of ethylenically-unsaturated monomer) | | 69.7 | 84.9 | 69.8 | 69.8 | 0.0 |
| ACN (wt %, to total weight of ethylenically-unsaturated monomer) | | 29.9 | 15.0 | 29.9 | 29.9 | 99.7 |
| Conversion ratio (wt %) | 1st step | 93 | 91 | 80 | 84 | 83 |
|  | 2nd step | — | — | 92 | 92 | 93 |
| Content of fine particles (wt %, to fine-particle-dispersed polyol) | | 50.0 | 40.0 | 50.0 | 50.0 | 50.0 |
| Viscosity (mPa·s) | | 8,500 | 8,300 | 8,200 | 7,300 | 7,500 |
| Coarse particle content (wt ppm) | | 18 | 19 | 6 | 11 | 12 |
| Evaluation of polyurethane foam | | Ex. 32 | Ex. 33 | Ex. 34 | Ex. 35 | Ex. 36 |

|  |  | Comparative Example | | | | | | |
|---|---|---|---|---|---|---|---|---|
|  |  | 1 | 2 | 3 | 4 | 5 | 6 | 7 |
| Fine-particle-dispersed polyol | | R-1 | R-2 | R-3 | R-4 | R-5 | R-6 | R-7 |
| Fine-particle-dispersed polyol intermediate | | H-1 | H-1 | H-1 | H-8 | H-9 | H-10 | H-11 |
|  | Comp. of P1 | ACN/St | ACN/St | ACN/St | — | ACN/St | ACN/St | ACN/St |
|  | (R1) (μm) | 0.2 | 0.2 | 1.2 | | 0.5 | 0.5 | 1.2 |
| Weight of (b)/total weight of (a), (P1), (b), (c), (d) and (f) (wt %) | | 5 | 42 | 19 | 35 | 32 | 4 | 19 |
| n | | 3 | 3 | 3 | 3 | 2 | 2 | 2 |
| Volume-average particle diameter (R) of (I) | | 1.1 | 1.1 | 0.9 | 1.6 | 1.5 | 0.5 | 1.1 |
| Content of fine particles in (P1) (vol %) | | 5 | 3 | 5 | 0 | 15.7 | 44.1 | 29.4 |

TABLE 5-continued

| | | | | | | | | |
|---|---|---|---|---|---|---|---|---|
| Content of fine particles in (I) (vol %) | | 49 | 29 | 49 | 49 | 49 | 49 | 49 |
| {(V)/(Q)} | | 10 | 10 | 10 | — | 3 | 1 | 2 |
| Formula | Formula (1) | Not satisfied | Not satisfied | Satisfied | Not satisfied | Not satisfied | Satisfied | Satisfied |
| | Formula (1') | Not satisfied | Not satisfied | Satisfied | Not satisfied | Not satisfied | Satisfied | Satisfied |
| | Formula (1") | Not satisfied | Not satisfied | Satisfied | Not satisfied | Not satisfied | Satisfied | Satisfied |
| | Formula (2) | Satisfied | Satisfied | Not satisfied | Not satisfied | Satisfied | Not satisfied | Not satisfied |
| | Formula (2') | Satisfied | Satisfied | Not satisfied | Not satisfied | Satisfied | Not satisfied | Not satisfied |
| | Formula (2") | Satisfied | Satisfied | Not satisfied | Not satisfied | Satisfied | Not satisfied | Not satisfied |
| St (wt %, to total weight of ethylenically-unsaturated monomer) | | 69.8 | 69.8 | 69.8 | 69.8 | 69.8 | 69.9 | 69.9 |
| ACN (wt %, to total weight of ethylenicallly-unsaturated monomer) | | 29.9 | 29.9 | 29.9 | 29.9 | 29.9 | 30.0 | 29.9 |
| Conversion ratio (wt %) | 1st step | 65 | 82 | 73 | 82 | 87 | 88 | 86 |
| | 2nd step | 89 | 90 | 89 | 88 | — | — | — |
| Content of fine particles (wt %, to fine-particle-dispersed polyol) | | 50.0 | 30.0 | 50.0 | 50.0 | 50.0 | 50.0 | 50.0 |
| Viscosity (mPa·s) | | 9,200 | 9,500 | 23,000 | 13,000 | 9,500 | 10,300 | 9,600 |
| Coarse particle content (wt ppm) | | 18 | 40 | 338 | 220 | 32 | 320 | 320 |
| Evaluation of polyurethane foam | | Comp. Ex. 8 | Comp. Ex. 9 | Comp. Ex. 10 | Comp. Ex. 11 | Comp. Ex. 12 | Comp. Ex. 13 | Comp. Ex. 14 |

TABLE 6

| | | Example | | | | | | | | | | | | |
|---|---|---|---|---|---|---|---|---|---|---|---|---|---|---|
| | | 18 | 19 | 20 | 21 | 22 | 23 | 24 | 25 | 26 | 27 | 28 | 29 | 30 |
| Formulation (part) | Fine-particle-dispersed polyol | I-1 55 | I-1 100 | I-1 70 | I-2 55 | I-3 55 | I-4 55 | I-5 55 | I-6 55 | I-7 55 | I-8 55 | I-9 55 | I-10 55 | I-11 55 |
| | Polyol (a1-1) | 45 | 0 | 30 | 45 | 45 | 45 | 45 | 45 | 45 | 45 | 45 | 45 | 45 |
| | Water | 2.8 | 2.8 | 2.8 | 2.8 | 2.8 | 2.8 | 2.8 | 2.8 | 2.8 | 2.8 | 2.8 | 2.8 | 2.8 |
| | Catalyst A | 0.06 | 0.06 | 0.06 | 0.06 | 0.06 | 0.06 | 0.06 | 0.06 | 0.06 | 0.06 | 0.06 | 0.06 | 0.06 |
| | Catalyst B | 0.18 | 0.18 | 0.18 | 0.18 | 0.18 | 0.18 | 0.18 | 0.18 | 0.18 | 0.18 | 0.18 | 0.18 | 0.18 |
| | SRX-280A | 0.5 | 0.5 | 0.5 | 0.5 | 0.5 | 0.5 | 0.5 | 0.5 | 0.5 | 0.5 | 0.5 | 0.5 | 0.5 |
| | TDI-80 | 35.1 | 33.3 | 34.4 | 35.3 | 34.9 | 35.2 | 34.9 | 36.0 | 35.5 | 36.0 | 35.1 | 36.2 | 35.2 |
| <Foam properties> | | | | | | | | | | | | | | |
| Density [kg/m$^3$] | | 34.8 | 35.8 | 35.6 | 35.2 | 35.0 | 35.1 | 35.1 | 35.2 | 34.9 | 35.3 | 35.2 | 35.2 | 35.2 |
| 25% ILD [kgf/314 cm$^2$] | | 31.8 | 38.5 | 33.8 | 31.5 | 30.9 | 30.6 | 30.5 | 30.8 | 32.5 | 29.8 | 32.3 | 32.1 | 31.8 |
| Tensile strength [kgf/cm$^2$] | | 1.68 | 1.72 | 1.68 | 1.67 | 1.68 | 1.68 | 1.67 | 1.67 | 1.70 | 1.71 | 1.70 | 1.65 | 1.68 |
| Tear strength [kgf/cm] | | 0.83 | 0.89 | 0.87 | 0.83 | 0.86 | 0.80 | 0.85 | 0.83 | 0.78 | 0.88 | 0.86 | 0.82 | 0.84 |
| Elongation at break [%] | | 102 | 69 | 81 | 103 | 105 | 110 | 103 | 107 | 101 | 108 | 100 | 101 | 102 |
| Compression set [%] | | 3.9 | 4.5 | 3.8 | 3.8 | 3.9 | 4.5 | 3.7 | 3.9 | 4.1 | 4.1 | 3.9 | 3.9 | 4.5 |

TABLE 7

| | | Example | | | | | | Comparative Example | | | | | | |
|---|---|---|---|---|---|---|---|---|---|---|---|---|---|---|
| | | 31 | 32 | 33 | 34 | 35 | 36 | 8 | 9 | 10 | 11 | 12 | 13 | 14 |
| Formulation (part) | Fine-particle-dispersed polyol | I-12 55 | I-13 55 | I-14 55 | I-15 55 | I-16 55 | I-17 55 | R-1 55 | R-2 55 | R-3 55 | R-4 55 | R-5 55 | R-6 55 | R-7 55 |
| | Polyol (a1-1) | 45 | 45 | 45 | 45 | 45 | 45 | 45 | 45 | 45 | 45 | 45 | 45 | 45 |
| | Water | 2.8 | 2.8 | 2.8 | 2.8 | 2.8 | 2.8 | 2.8 | 2.8 | 2.8 | 2.8 | 2.8 | 2.8 | 2.8 |
| | Catalyst A | 0.06 | 0.06 | 0.06 | 0.06 | 0.06 | 0.06 | 0.06 | 0.06 | 0.06 | 0.06 | 0.06 | 0.06 | 0.06 |

TABLE 7-continued

|  | Example | | | | | | Comparative Example | | | | | | |
| --- | --- | --- | --- | --- | --- | --- | --- | --- | --- | --- | --- | --- | --- |
|  | 31 | 32 | 33 | 34 | 35 | 36 | 8 | 9 | 10 | 11 | 12 | 13 | 14 |
| Catalyst B | 0.18 | 0.18 | 0.18 | 0.18 | 0.18 | 0.18 | 0.18 | 0.18 | 0.18 | 0.18 | 0.18 | 0.18 | 0.18 |
| SRX-280A | 0.5 | 0.5 | 0.5 | 0.5 | 0.5 | 0.5 | 0.5 | 0.5 | 0.5 | 0.5 | 0.5 | 0.5 | 0.5 |
| TDI-80 | 35.3 | 35.8 | 35.8 | 35.3 | 34.9 | 35.2 | 36.1 | 35.1 | 35.1 | 35.5 | 35.6 | 35.6 | 32.7 |
| <Foam properties> | | | | | I-17 | | | | | | | | |
| Density [kg/m$^3$] | 35.2 | 35.2 | 35.2 | 35.2 | 35.0 | 35.1 | 34.9 | 34.8 | Not foamed | 34.9 | 35 | 35.2 | 34.8 |
| 25% ILD [kgf/314 cm$^2$] | 31.5 | 31.4 | 31.8 | 31.5 | 30.9 | 30.6 | 23.5 | 18.5 |  | 22.4 | 22.6 | 26.5 | 25.8 |
| Tensile strength [kgf/cm$^2$] | 1.64 | 1.58 | 1.52 | 1.67 | 1.68 | 1.68 | 1.35 | 1.20 |  | 1.32 | 1.32 | 1.55 | 1.45 |
| Tear strength [kgf/cm] | 0.84 | 0.82 | 0.81 | 0.83 | 0.86 | 0.80 | 0.79 | 0.72 |  | 0.71 | 0.78 | 0.75 | 0.77 |
| Elongation at break [%] | 104 | 100 | 103 | 103 | 105 | 110 | 85 | 97 |  | 87 | 88 | 85 | 89 |
| Compression set [%] | 3.8 | 3.9 | 3.8 | 3.8 | 3.9 | 4.5 | 3.3 | 4.4 |  | 4.5 | 4.5 | 4.2 | 4.3 |

Foam property evaluating methods adopted for Tables 6 and 7 are as follows:

(1) Density (kg/m$^3$): according to JIS K6400-1997 [item 5]

(2) 25% ILD (hardness) (kgf/314 cm$^2$): according to JIS K6382-1995 [item 5.3]

(3) Tensile strength (kgf/cm$^2$): according to JIS K6301-1995 [item 3]

(4) Tear strength (kgf/cm): according to JIS K6301-1995 [item 9]

(5) Elongation at break (%): according to JIS K6301-1995 [item 3]

(6) Compression set N: according to JIS K6382-1995 [item 5.5]

It should be noted that usually, as the properties of polyurethane foams, a density in the range of 15 to 50 kg/m$^3$ is preferable, and larger values of 25% ILD, tensile strength, tear strength, and elongation at break are preferable. Furthermore, a smaller value of compression set is preferable.

From the results shown in Tables 4 and 5, the following is clarified. The fine-particle-dispersed polyols obtained in Examples 1 to 8 and 15 to 17 had smaller volume-average particle diameters (R) of fine particles therein, smaller coarse particle contents, and higher conversion ratios of monomers in Second Step, as compared with Comparative Example 1. The polyol obtained in Comparative Example 2, as compared with Examples, had a large volume-average particle diameter, although it had a small polymer content. The polyol obtained in Comparative Example 3, which did not satisfy Formula (2) since R was smaller than R1, had a large coarse particle content, and had a high viscosity. The polyol obtained in Comparative Example 4, without use of a fine-particle-dispersed polyol intermediate, had a large volume-average particle diameter, and a large coarse particle content. The polyols obtained in Examples 9 to 14, as compared with the polyol obtained in Comparative Example 5, had smaller volume-average particle diameters (R) of fine particles therein, smaller coarse particle contents, and higher conversion ratios of monomers in First Step. The polyol obtained in Comparative Example 6, as compared with Examples, had a smaller volume-average particle diameter, but it has a higher viscosity and a higher coarse particle content. The polyol obtained in Comparative Example 7, which did not satisfy Formula (2) since R was smaller than R1, had a large coarse particle content, and had a high viscosity.

Further, the results shown in Tables 6 and 7, the following is clarified: the polyurethane foams obtained using the polymer polyols of Examples 1 to 8 and 15 to 17 were determined to be superior to polyurethane foams obtained using the polymer polyols of Comparative Examples 1 to 4 when they were evaluated regarding mechanical properties (2) to (6) described above, particularly the tear strength. The polyurethane foams obtained using the polymer polyols of Examples 9 to 14 were determined to be superior to the polyurethane foams obtained using the polymer polyols of Comparative Examples 5 to 7 when they were evaluated regarding the mechanical properties (2) to (6) described above, particularly the tear strength.

INDUSTRIAL APPLICABILITY

A polyurethane resin of the present invention, produced using a fine-particle-dispersed polyol obtained by the method for producing a fine-particle-dispersed polyol according to the present invention, is used for various applications in which a polyurethane resin is used usually; particularly, the foregoing polyurethane resin suitably is used as a polyurethane foam so as to be applied in interior parts of furniture, and the like.

The invention claimed is:

1. A method for producing a fine-particle-dispersed polyol (I) containing polymer fine particles (P) dispersed therein, the method comprising steps of:

(1) polymerizing an ethylenically unsaturated monomer (b) in a polyol (a), in the presence of fine particles (P1) and a radical polymerization initiator (c), and optionally in the presence of at least one material selected from a dispersant (d) and a diluent (f) as required, so as to obtain a fine-particle-dispersed polyol intermediate (B2); and (n–1) polymerizing (b) in a fine-particle-dispersed polyol intermediate (B(n–1)), in the presence of (c), and optionally in the presence of at least one material selected from (d) and (f) as required, so as to obtain a fine-particle-dispersed polyol intermediate (Bn) or the fine-particle-dispersed polyol (I), where n represents an integer from 3 to 7, wherein the (P1) have a volume-average particle diameter (R1) in a range from 0.01 µm to 1.0 µm, a concentration of the (b) in the step (1) relative to a total weight of the (a), the (P1), the (b), the (c), the (d), and the (f) is in a range from 7 wt % to 40 wt %, in the step (1), the fine particles (P1) are dispersed in the polyol (a) preliminarily so that a concentration of the fine particles (P1) is in a range from 26 wt % to 90 wt % relative to a total weight of the fine particles (P1) and the polyol (a), in the steps of polymerizing the ethylenically-unsaturated monomer (b), the polymerization is further carried out in the presence of an active-hydrogen-containing compound (D) having a number-average molecular weight of 150 to 2,000 and having an aromatic ring, and the active-hydrogen-containing compound (D) comprises at least one compound selected from the group consisting of an aromatic-ring-containing ether (D1) and an aromatic-ring-containing ester (D2),
wherein the aromatic-ring-containing ether (D1) is selected from the group consisting of:
a compound obtained by adding an alkylene oxide to a monovalent phenol, which is selected from cresol, naphthol, and monostyrenated phenol, to a divalent phenol, which is selected from catechol, resorcinol, and bisphenol, to a trivalent phenol, or to a higher than trivalent phenol;
a compound obtained by adding an alkylene oxide to 1,4-dihydroxynaphthalene or 1,8-dihydroxynaphthalene, and
a compound obtained by adding an alkylene oxide to 4,4'-dihydroxy-3,3',5,5'-tetrahydroxyphenylmethyl-2,2'-diphenylpropane; and
the aromatic-ring-containing ester (D2) is a compound obtained by adding an alkylene oxide to at least one aromatic-ring-containing carboxylic acid selected from the group consisting of a monovalent carboxylic acid, which is selected from benzoic acid and salicylic acid, a divalent carboxylic acid, which is selected from phthalic acid and terephthalic acid, a trivalent carboxylic acid, and a higher than trivalent carboxylic acid.

2. The method according to claim 1, further comprising a step of subjecting the fine-particle-dispersed polyol intermediate (Bn) to vacuum stripping.

3. The method according to claim 1, wherein a content of the polymer fine particles (P) in the fine-particle dispersed polyol (I) is in a range from 35 wt % to 60 wt %.

4. The method according to claim 1, wherein polymer fine particles (P) obtained by the polymerization of the ethylenically-unsaturated monomer (b) are used as the fine particles (P1).

5. The method according to claim 1, wherein the ethylenically-unsaturated monomer (b) comprises at least one material selected from styrene and acrylonitrile.

6. The method according to claim 1, wherein, in the step of polymerizing the ethylenically-unsaturated monomer (b), the polymerization is carried out in the presence of the dispersant (d).

7. The method according to claim 1,
wherein, in the step of polymerizing the ethylenically-unsaturated monomer (b), the polymerization is carried out in the presence of the diluent (f), and
the diluent (f) is at least one material selected from the group consisting of aliphatic hydrocarbons, alicyclic hydrocarbons, and aromatic hydrocarbons.

8. The method according to claim 1, wherein the radical polymerization initiator (c) comprises an azo compound and a peroxide,
wherein the azo compound satisfies a relational expression of Formula (3), and
the peroxide satisfies a relational expression of Formula (4) and has a hydrogen abstraction ability in a range from 0% to 30%:

$$(Tp-100) \leq Th \leq (Tp-55) \quad (3)$$

$$(Tp-50) \leq Th \leq (Tp+20) \quad (4)$$

where Tp represents a polymerization temperature (° C.), and Th represents a 10-hour half-value-period temperature (° C.) of the radical polymerization initiator.

9. The method according to claim 1,
wherein the active-hydrogen-containing compound (D) having an aromatic ring is an alkylene oxide adduct of an active-hydrogen-containing compound (e) having one or more active hydrogen atoms, and
a hydroxyl equivalent and an SP value of the (e) satisfy Formulae (5) and (6), respectively:

$$80 \leq X \leq 360 \quad (5)$$

$$-0.012 \times X + 14.0 \leq S \leq -0.012 \times X + 17.0 \quad (6)$$

where X represents the hydroxyl equivalent of the active-hydrogen-containing compound (e), and S represents the SP value of the active-hydrogen-containing compound (e).

10. The method according to claim 1, wherein an amount (wt %) of the active-hydrogen-containing compound (D) having an aromatic ring is in a range from 0.1 wt % to 20 wt % relative to a weight of the ethylenically-unsaturated monomer (b).

11. The method according to claim 1, wherein the fine particles (P1) and the polymer fine particles (P) satisfy relational expressions of Formulae (1) and (2):

$$(R) \leq (2.0) \times (R1) \times \sqrt[3]{[(V)/(Q)]} \quad (1)$$

$$(R) \geq (R1) \quad (2)$$

where R represents a volume-average particle diameter of the (P);
R1 represents a volume-average particle diameter of the (P1);
V represents a content (vol %) of the fine particles (P1) in the fine-particle-dispersed polyol (I); and
Q represents {weight of (P1)×specific gravity of (P1)}/ {weight of (I)×specific gravity of (I)}.

12. A method for producing polyurethane by reacting a polyol component and an isocyanate component with each other,
wherein the polyol component comprises the fine-particle-dispersed polyol (I) obtained by a method according to claim 1, and
a content of the fine-particle-dispersed polyol (I) is in a range from 10 wt % to 100 wt % relative to a weight of the polyol component.

13. A method for producing a fine-particle-dispersed polyol (I) containing polymer fine particles (P) dispersed therein, the method comprising a step of:
polymerizing an ethylenically unsaturated monomer (b) in a fine-particle-dispersed polyol intermediate (B1) composed of a polyol (a) and fine particles (P1) dispersed in the polyol (a), in the presence of a radical polymerization initiator (c), and optionally in the presence of at least one material selected from a dispersant (d) and/or a diluent (f) as required,
wherein a volume-average particle diameter (R1) of the (P1) is in a range from 0.01 μm to 1.0 μm, and
a concentration of the (b) relative to a total weight of the (B1), the (b), the (c), the (d), and the (f) is in a range from 7 wt % to 30 wt %,
in the step of polymerizing the ethylenically-unsaturated monomer (b), the fine particles (P1) are dispersed in the polyol (a) preliminarily so that a concentration of the fine particles (P1) is in a range from 26 wt % to 90 wt % relative to a total weight of the fine particles (P1) and the polyol (a),
in the polymerizing step, the polymerization is carried out in the presence of an active-hydrogen-containing compound (D) having a number-average molecular weight of 150 to 2,000 and having an aromatic ring, and the active-hydrogen-containing compound (D) comprises at least one compound selected from the group consist of an aromatic-ring-containing ether (D1) and an aromatic-ring-containing ester (D2), wherein the aromatic-ring-containing ether (D1) is selected from the group consisting of:

a compound obtained by adding an alkylene oxide to a monovalent phenol, which is selected from cresol, naphthol, and monostyrenated phenol, to a divalent phenol, which is selected from catechol, resorcinol, and bisphenol, to a trivalent phenol, or to a higher than trivalent phenol;

a compound obtained by adding an alkylene oxide to 1,4-dihydroxynaphthalene or 1,8-dihydroxynaphthalene; and a compound obtained by adding an alkylene oxide to 4,4'-dihydroxy-3,3',5,5'-tetrahydroxyphenylmethyl-2,2'-diphenylpropane, and the aromatic-ring-containing ester (D2) is a compound obtained by adding an alkylene oxide to at least one aromatic-ring-containing carboxylic acid selected from the group consisting of a monovalent carboxylic acid, which is selected from benzoic acid and salicylic acid, a divalent carboxylic acid, which is selected from phthalic acid and terephthalic acid, a trivalent carboxylic acid, and a higher than trivalent carboxylic acid.

14. The method according to claim 13, further comprising a step of carrying out vacuum stripping, after the polymerization of the ethylenically-unsaturated monomer (b).

15. The method according to claim 13, wherein the fine particles (P1) and the polymer fine particles (P) satisfy relational expressions of the Formulae (1) and (2):

$$(R) \leq (2.0) \times (R1) \times \sqrt[3]{[(V)/(Q)]} \quad (1)$$

$$(R) \geq (R1) \quad (2),$$

where R represents a volume-average particle diameter of the (P);

R1 represents a volume-average particle diameter of the (P1);

V represents a content (vol %) of the fine particles in fine-particle-dispersed polyol (I); and Q represents {weight of (P1)×specific gravity of (P1)}/ {weight of (I)×specific gravity of (I)}.

16. The method according to claim 13, wherein a content of the polymer fine particles (P) in the fine-particle dispersed polyol (I) is in a range from 35 wt % to 60 wt %.

17. The method according to claim 13, wherein polymer fine particles (P) obtained by the polymerization of the ethylenically-unsaturated monomer (b) are used as the fine particles (P1).

18. The method according to claim 13, wherein the ethylenically-unsaturated monomer (b) comprises at least one material selected from styrene and acrylonitrile.

19. The method according to claim 13, wherein, in the step of polymerizing the ethylenically-unsaturated monomer (b), the polymerization is carried out in the presence of the dispersant (d).

20. The method according to claim 13, wherein, in the step of polymerizing the ethylenically-unsaturated monomer (b), the polymerization is carried out in the presence of the diluent (f), and the diluent (f) is at least one material selected from the group consisting of aliphatic hydrocarbons, alicyclic hydrocarbons, and aromatic hydrocarbons.

21. The method according to claim 13, wherein the radical polymerization initiator (c) comprises an azo compound satisfying an relational expression of Formula (3), and a peroxide satisfying a relational expression of Formula (4) and having a hydrogen abstraction ability in a range from 0% to 30%:

$$(Tp-100) \leq Th \leq (Tp-55) \quad (3)$$

$$(Tp-50) \leq Th \leq (Tp+20) \quad (4)$$

where Tp represents a polymerization temperature (° C.), and Th represents a 10-hour half-value-period temperature (° C.) of the radical polymerization initiator.

22. A method for producing polyurethane by reacting a polyol component and an isocyanate component with each other, wherein the polyol component comprises the fine-particle-dispersed polyol (I) obtained by a method according to claim 13, and a content of the fine-particle-dispersed polyol (I) is in a range from 10 wt % to 100 wt % relative to a weight of the polyol component.

\* \* \* \* \*